(12) United States Patent
Antoun et al.

(10) Patent No.: US 7,409,145 B2
(45) Date of Patent: Aug. 5, 2008

(54) SMART PROFILES FOR CAPTURING AND PUBLISHING AUDIO AND VIDEO STREAMS

(75) Inventors: Tony M. Antoun, Renton, WA (US); Olivier Colle, Redmond, WA (US); Gareth Alan Howell, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1430 days.

(21) Appl. No.: 10/335,631

(22) Filed: Jan. 2, 2003

(65) Prior Publication Data

US 2004/0131340 A1 Jul. 8, 2004

(51) Int. Cl.
*H04N 5/00* (2006.01)
*H04N 7/00* (2006.01)

(52) U.S. Cl. .................................. 386/125; 386/105

(58) Field of Classification Search ................ 386/125, 386/124, 46, 117, 107, 45, 104, 105
See application file for complete search history.

(56) References Cited

U.S. PATENT DOCUMENTS 4,974,178 A * 11/1990 Izeki et al. .................. 715/202

2002/0051493 A1 * 5/2002 Shin et al. ............... 375/240.11
2005/0165779 A1 * 7/2005 Kaiser et al. .................... 707/6

OTHER PUBLICATIONS

Ripley, "DVI—A Digital Multimedia Technology," Communications of the ACM, Jul. 1989, vol. 32, No. 7.
Mukhopadhyay et al., "Passive Capture and Structuring of Lectures," Department of Computer Science, 1999, New York, U.S.A.
Myers et al., "A Multi-View Intelligent Editor for Digital Video Libraries," Human Computer Interaction Institute, 2001, Pennsylvania, U.S.A.
Finkelstein et al., "Multiresolution Video," Department of Computer Science and Engineering, 1996, Washington, U.S.A.

* cited by examiner

*Primary Examiner*—Robert Chevalier
(74) *Attorney, Agent, or Firm*—Senniger Powers LLP

(57) ABSTRACT

A method and system for capturing video and/or audio streams and for publishing consolidated video and/or consolidated audio streams. A capture profile specifying parameters for capturing the video stream and/or audio stream is selected from a list of predefined profiles as a function of data contained in the video and/or audio stream. A publish profile specifying parameters for publishing the video stream and/or audio stream is selected from a list of predefined profiles as a function of data contained in the consolidated video and/or consolidated audio stream. Moreover, the publish profile is selected to provide the best quality video and/or audio during playback, or to provide the best fir for a maximum file size designated by the user.

79 Claims, 12 Drawing Sheets

FIG. 1B

Save Movie Wizard 

Movie Setting
  Select the setting you want to use to save your movie. The setting you select determines the quality and file size of your saved movie.

○ Best quality for playback on my computer (recommended)
○ Best fit to file size: [ 75 ] [ MB ▼ ]
● Other settings: [ Video for Pocket PC (218 Kbps) ▼ ]

Show fewer choices...

- Video for Pocket PC (218 Kbps)
- Video for Pocket PC (143 Kbps)
- Video for Pocket PC (Full screen 218 Kbps)
- High quality video (large)
- High quality video (small)
- Video for local playback (2.1 Mbps)
- Video for LAN (1.0 Mbps)
- Video for LAN (768 Kbps)
- Video for broadband (512 Kbps)
- Video for broadband (340 Kbps)
- Video for broadband (150 Kbps)
- Video for ISDN (48 Kbps)
- Video for dial-up access (38 Kbps)
- DV-AVI (NTSC)
- High quality video (NTSC)
- Video for local playback (2.1 Mbps NTSC)
- Video for local playback (1.5 Mbps NTSC)
- Test quality of 320x240 vs 640x480

Setting details
File type: Windows
Bit rate: 218 Kbps
Display size: 208 x
Aspect ratio: 4:3
Frames per second

[ < Back ]  [ Next > ]  [ Cancel ]

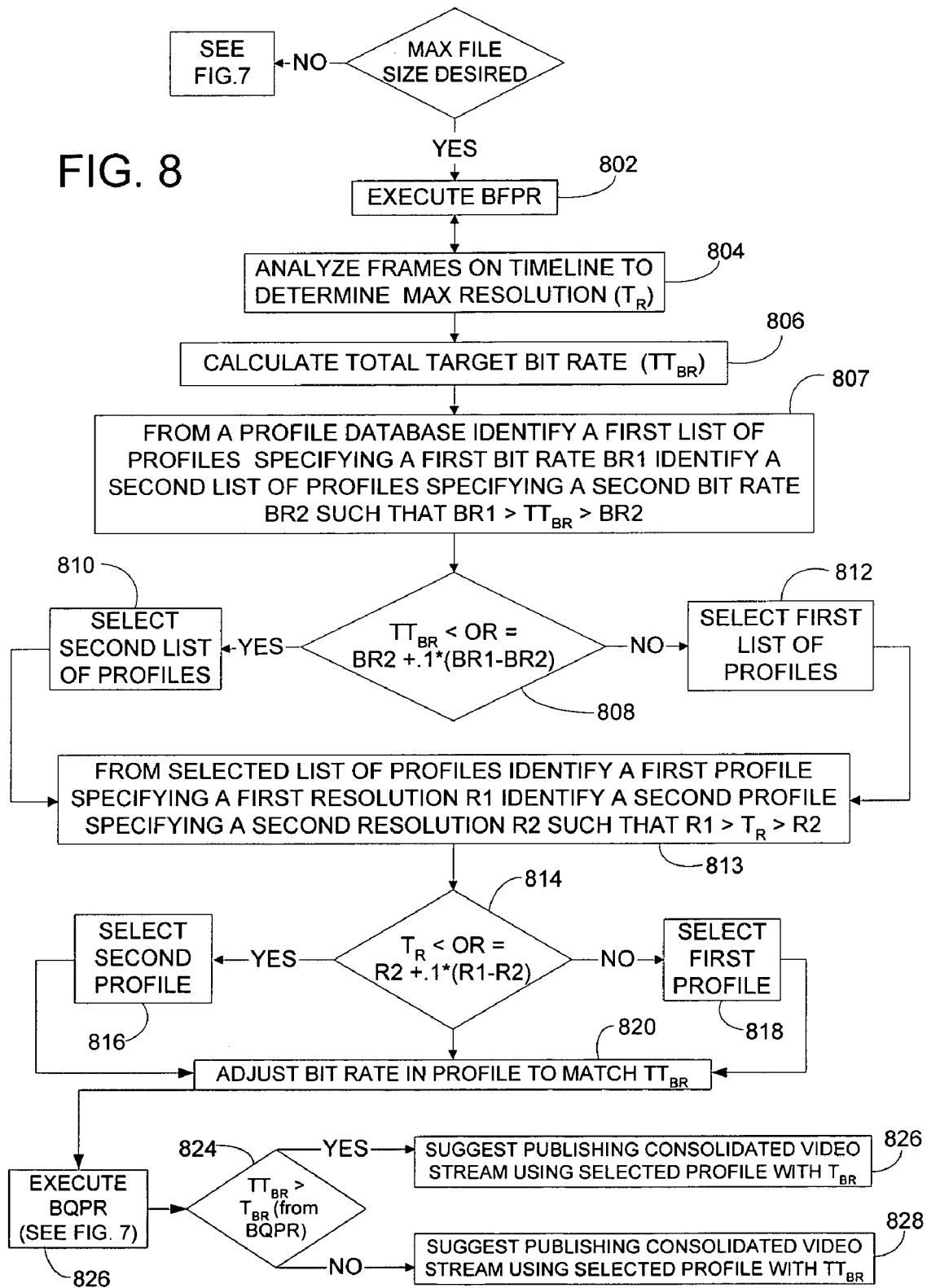

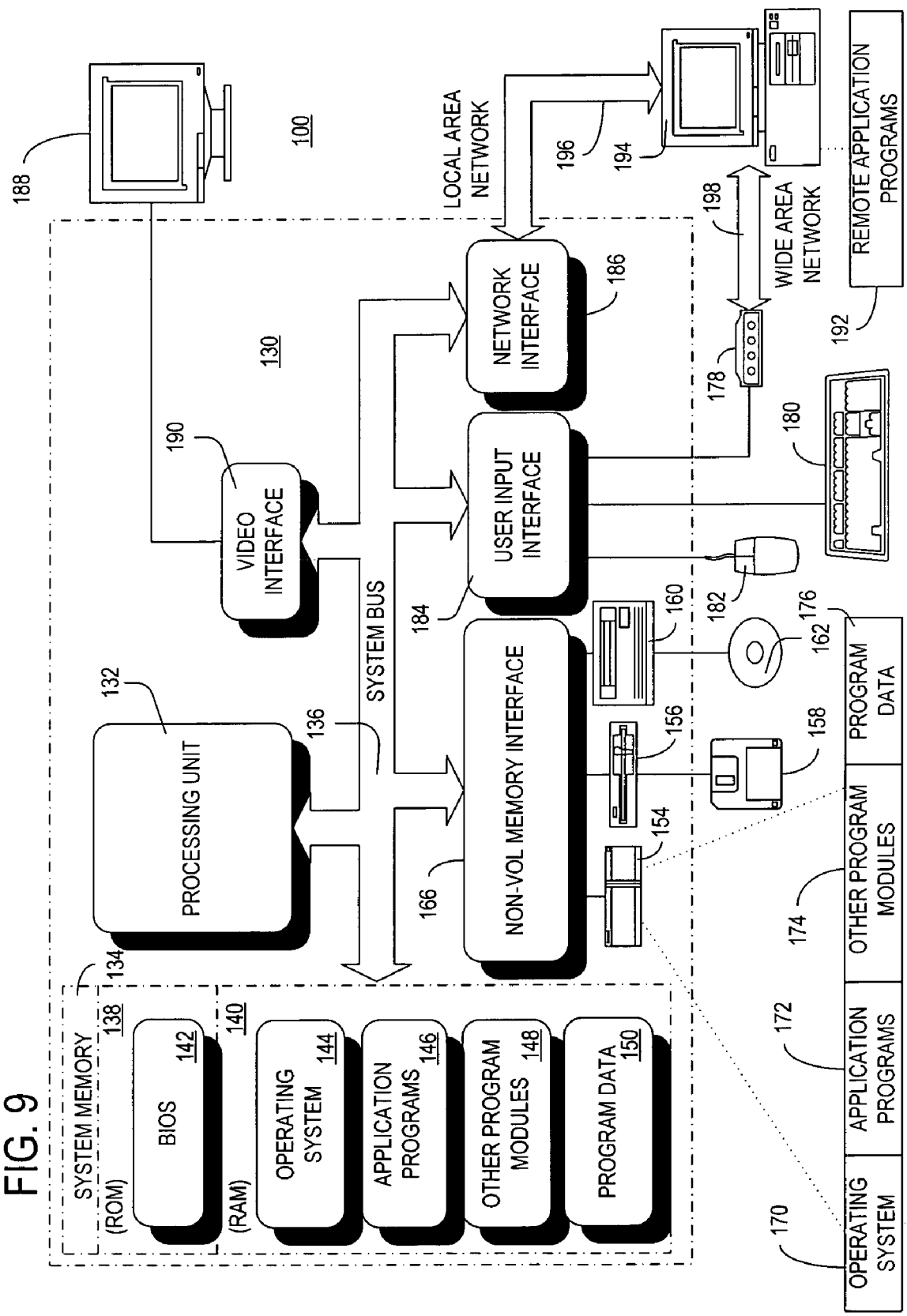

SMART PROFILES FOR CAPTURING AND PUBLISHING AUDIO AND VIDEO STREAMS

TECHNICAL FIELD

The present invention relates to the field of capturing and publishing audio and video streams. Specifically, the present invention pertains to the automatic selection of appropriate audio and video profiles for use during capture and publication of audio and video streams.

BACKGROUND OF THE INVENTION

An increasing number of people own and use camcorders to make videos that capture their experiences and document their lives. Multimedia editing applications (MEA) allow users to bring new life to such videos via their personal computer by bringing professional video and audio editing to personal computers. However, MEAs are not always user friendly and users who are less experienced with such applications may be overwhelmed.

The first step in editing video and audio material with an MEA is importing a video and/or an audio stream from a source to a computer storing the MEA. This process of importing video and/or audio streams to the computer is also known as capturing. The next step is converting the video and audio data contained in the respective stream into the appropriate format (i.e., digital) for storage on the computer as individual files or clips. Traditional MEAs include a library or a bin in which the user can assemble and organize clips stored on disk, view the name and a thumbnail of each clip, and preview their contents. Each clip can then be edited, and dragged to a timeline or storyboard to assemble a production.

The centerpiece of any video editing tool is the storyboard or the timeline in which the user arranges the video or audio production. This allows the user to organize the video and audio clips, insert transitions between them, and apply special effects, and add titles and background audio. The consolidated video or audio production can then be saved or "published" to the hard drive of the computer or to an external storage medium such as a DVD or CD. In addition, the consolidated video or audio production can be played on a monitor or speakers, respectively, linked with the computer.

Traditional MEAs have emphasized ease of use by constraining the user interface, simplifying the layout process, restricting the number of parallel tracks, and providing a step-by-step process for adding effects. However, a number of design choices are made prior to capturing video and audio material and prior to publishing the consolidated video and audio material (i.e., production). These choices include resolution, frame rate, and bit rate. These parameters can determine the amount of disk space used, image quality and playback rate.

In fact, in order to use the MEA effectively, MEAs often require the user to define profiles specifying parameters for capturing video and audio material, and for publishing the consolidated video and audio material. However, defining a profile for capturing and for publishing can be a daunting task for novice users, especially if the user does not know or understand the meaning of resolution, frame rate, bit rate, etc.

For these reasons, there is a need for an MEA that allows the user to easily capture and publish their video and audio material at the appropriate quality and/or size for what they are trying to achieve. Moreover, the capturing and publishing process should be accomplished without requiring the user to have knowledge of bit rates, resolution, frame rates, compression formats, etc.

SUMMARY OF THE INVENTION

The invention provides an MEA for capturing and publishing video and/or audio streams. In particular, the invention automatically suggesting parameters settings to use for capturing and/or publishing video or audio streams.

In accordance with one aspect of the invention, a computer readable medium includes executable instructions for capturing a video stream. The executable instructions include format instructions for determining a format of the video stream. The executable instructions also include property instructions for determining a property of the of the video stream. The executable instructions also include selecting instructions for selecting a profile that corresponds to the determined format and the determined property of the video stream. The executable instructions further include capturing instructions for capturing the video stream according to the selected profile.

In accordance with another aspect of the invention, a method is provided for capturing a video stream according to one of a list of profiles, each profile specifying a plurality of parameters for capturing a stream of video. The method includes determining a format of the video stream. The method also includes determining a property of the video stream. The method also includes selecting one of the profiles from the list of profiles that corresponds to the determined format and the determined property of the video stream. The method further includes capturing the video stream according to the selected profile.

In accordance with another aspect of the invention, a method is provided for publishing a video stream according to one of a list of profiles, each profile specifying a plurality of parameters for publishing a stream of video. The method includes determining a format of the video stream. The method also includes determining a property of the video stream. The method also includes selecting one of the profiles of list of profiles that correspond to the determined format and the determined property of the video stream. The method further includes publishing the video stream according to the selected profile.

In accordance with another aspect of the invention, a computer readable medium includes a capture routine for executing capturing instructions for capturing a video stream according to a capture profile selected from a list of profiles. The capture profile defines a video format and a video property of the video stream. The computer readable medium also includes a publishing routine for publishing a consolidated video stream according to a publish profile selected from the list of profiles. The publish profile defines a video format and a video property of the consolidated video stream.

In accordance with another aspect of the invention, a computer readable medium includes a capture routine for executing capturing instructions for capturing an audio stream according to a capture profile. The capture profile defines an audio property of the audio stream. The computer readable also includes a publishing routine for publishing a consolidated audio stream according to a publish profile. The publish profile defines an audio property of the consolidated audio stream.

In accordance with yet another aspect of the invention, a computer readable medium includes executable instructions for publishing a consolidated video stream from a timeline including a plurality of individual video streams. Format instructions determine a format of the consolidated video stream. Property instructions determine a property of the consolidated video stream. Identifying instructions identify a list of profiles that correspond to the determined format and the determined property of the consolidated video stream.

Selecting instructions select one of the identified list of profiles that correspond to the determined format and the determined property of the consolidated video stream. Publishing instructions publish the consolidated video stream according to the selected profile.

In accordance with another aspect of the invention, a computer readable medium includes executable instructions for publishing a consolidated video stream from a timeline including a plurality of individual video streams that have a total length of time. Format instructions determine a format of the consolidated video stream. Property instructions determine a property of the consolidated video stream. Determining instructions determine a target file size of the consolidated video stream to be published. Calculating instructions calculate a total target bit rate based on the determined target file size and the total length of time of the consolidated video stream. Identifying instructions identify a list of profiles that correspond to the calculated target bit rate. Selecting instructions select one of the profiles of the identified list of profiles that correspond to the calculated target bit rate. Publishing instructions publish the consolidated video stream according to the selected profile.

In accordance with another aspect of the invention, a computer readable medium includes executable instructions for capturing an audio stream. The computer readable medium also includes a list of profiles, each specifying a plurality of parameters for capturing a stream of audio. Property instructions determine a property of the audio stream. Selecting instructions selecting one of the profiles from the list of profiles that corresponds to the determined property of the audio stream. Capturing instructions capture the audio stream according to the selected profile.

In accordance with yet another aspect of the invention, a computer readable medium includes executable instructions for publishing a consolidated audio stream from a timeline including a plurality of individual audio streams. The computer readable medium includes a list of profiles, each specifying a plurality of parameters for publishing a stream of audio. Property instructions determine a property of the consolidated audio stream. Identifying instructions identify profiles from the list of profiles that correspond to the determined bit rate of the consolidated audio stream. Selecting instructions select one of the profiles from the identified list of profiles that correspond to the determined bit rate of the consolidated audio stream. Publishing instructions publish the consolidated audio stream according to the selected profile.

In accordance with another aspect of the invention, a computer readable medium includes executable instructions for publishing a consolidated audio stream from a timeline that includes a plurality of individual audio streams having a total length of time. The computer readable medium also includes a list of profiles, each specifying a plurality of parameters for publishing a stream of audio. Determining instructions determine a target file size of the consolidated audio stream to be published. Calculating instructions calculate a target bit rate based on the determined target file size and the total length of time of the consolidated audio stream. Identifying instructions identify profiles from the list of profiles that correspond to the calculated target bit rate. Selecting instructions select one of the profiles from the list of profiles that correspond to the calculated target bit rate. Publishing instructions publish the consolidated audio stream according to the selected profile.

In accordance with another aspect of the invention, a computer-readable medium stores a data structure. A first data field includes data representing a predefined list of profiles, and each profile specifies parameters for capturing a data stream. A second data field contains data representative of the data stream. A third functioning field retrieves one of the predefined list of profiles as a function the data representative of the data stream. Parameters specified in the retrieved profile are used for capturing the data stream.

In accordance with another aspect of the invention, a computer-readable medium stores a data structure. A first data field includes data representing a predefined list of profiles, and each profile specifies parameters for publishing the consolidated data stream. A second data field contains data representative of the consolidated data stream. A third functioning field retrieves one of the predefined list of profiles as a function the data representative of the consolidated data stream. Parameters specified in the retrieved profile are used for publishing the consolidated data stream.

Alternatively, the invention may comprise various other methods and apparatuses. Other features will be in part apparent and in part pointed out hereinafter.

BRIEF DESCRIPTION OF THE DRAWINGS

FIG. 1B is a screen shot illustrating a user interface allowing the selection of a publication target.

FIG. 8 is an exemplary flow chart illustrating operation of the best-fit video publication routine as described in reference to FIG. 6.

FIG. 9 is a block diagram illustrating one example of a suitable computing system environment in which the invention may be implemented.

Corresponding reference characters indicate corresponding parts throughout the drawings.

DETAILED DESCRIPTION OF THE INVENTION

Figure 1:
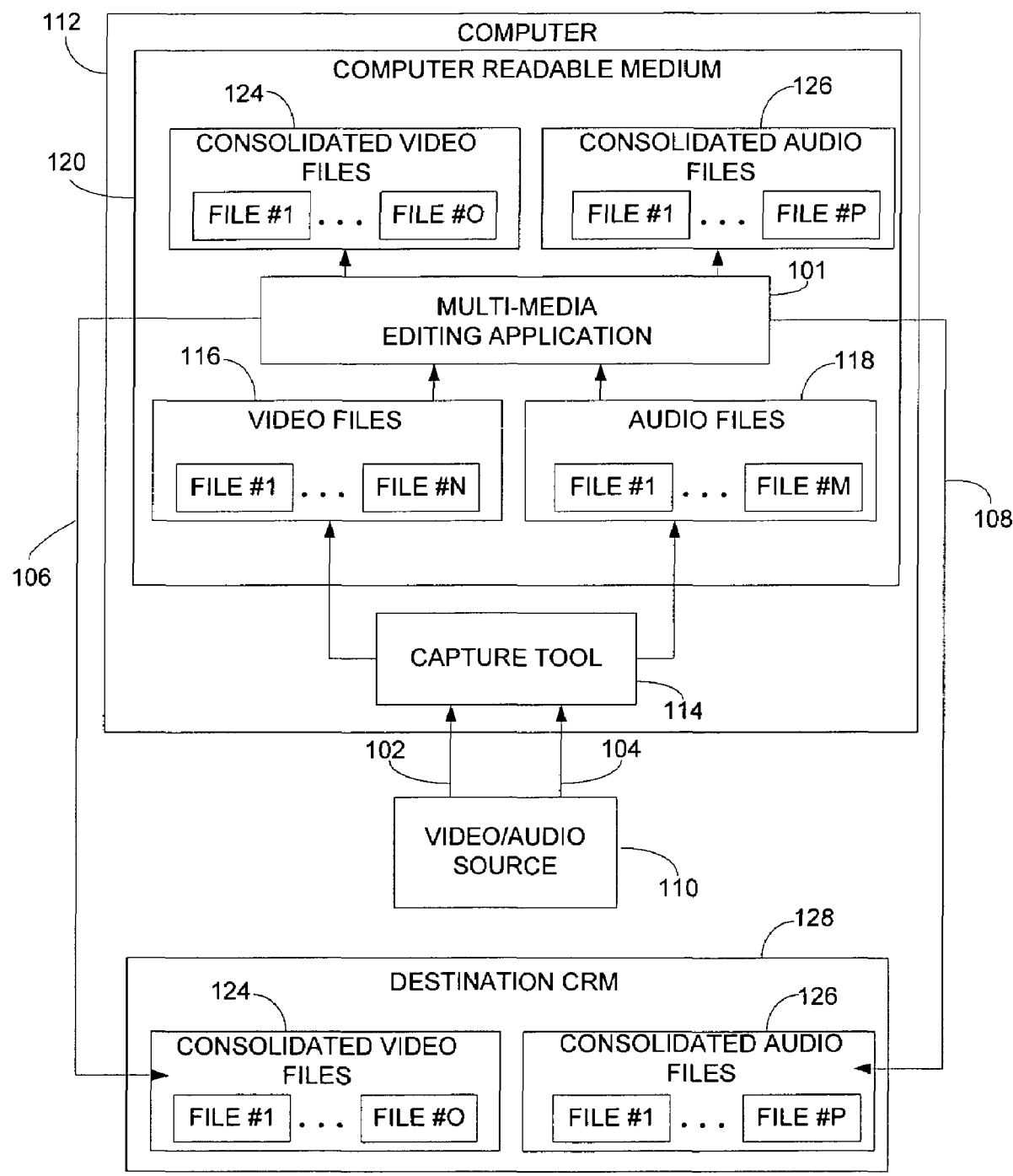
FIG. 1 is an exemplary block diagram illustrating a computer comprising a multimedia editing application for capturing a data stream and for publishing a consolidated data stream.

Referring first to FIG. 1, an exemplary block diagram illustrates a computer comprising an MEA 101 for capturing a video stream 102 or audio stream 104 and for publishing a consolidated video stream 106 or audio stream 108 to be captured from a video/audio source (V/A source) 110 linked to the computer 112.

The video stream 102 includes video data representative of a visual image or a series of visual images. The audio stream 104 includes audio data representative of one or more sounds, which may or may not correspond to the visual image or series of visual images. The V/A source 110 can be any device used to record a visual image or a series of visual images and/or sound data. The V/A source 110 may generate the video stream 102 or audio stream 104 as an analog signal or a digital signal. For example, the V/A source 110 can be an analog camcorder that generates the video stream 102 and audio stream 104 as analog signals. Alternatively, the V/A source 110 can be a web camera or DV camcorder that generates the video stream 102 as a digital signal. Whether analog or digital, the video stream 102 includes video format data. The video format data indicates a frame rate, a resolution, an aspect ratio, and a frame display mode of the individual video images or "frames" included in the video stream 102.

A capture tool 114 is linked to the computer 112 and the V/A source 110 for capturing the video format data, the video property data and/or the audio property data. As described above, video and audio streams 102, 104 can be generated in analog format or digital format. In the case of an analog format, the capture tool 114 digitizes the video stream or audio stream before transferring the format data to the computer 112 for storage. In other words, data contained in the analog video stream 102 and/or analog audio stream 104 is converted into binary format (i.e., digital format) for storage as a video file 116 or audio file 118, respectively. In this case, the video file 116 or audio file 118 is stored on a CRM 120 associated with the computer 112. For example, the CRM 120 may be the random access memory (RAM) of the computer 112 or the hard drive of the computer 112. In contrast, a digital stream is already in digital format and the capture tool 114 transfers the digital data directly to the CRM 120 of the computer for storage as a video file 116 or audio file 118. After the video file stored is stored on the hard drive in digital form (e.g. as a .avi, .wmv) it also contains video property data. The video property data indicates a total bit rate and a resolution of the individual video frames included in the video stream 102. After the audio file stored is stored on the hard drive in digital form (e.g. as .wma) it also contains audio property data. The audio property data indicates a bit rate, a sample frequency, and an output mode of the audio signal included in the audio stream 104.

In one embodiment, the capture tool 114 is a capture card that is connected to the computer 112 via an ISA slot or PCI slot. The capture card includes an input port that can be linked with an output port of the V/A source 110 via a cable such as S-video cable, or coaxial cable. Thereafter, video data or audio data can be transferred from V/A source 110 to the computer 112. For example, the video stream 102 can be captured from a VCR by connecting a cable to the video-output port on the back of the VCR and connecting the other end of the cable to the video-in of the video capture card. In an alternative embodiment, the capture tool 114 is a direct connection such as an Institute of Electrical and Electronic Engineers (IEEE) 1394 interface. Typically, the IEEE 1394 interface connection is used for capturing digital video. For example, the IEEE 1394 interface can be connected to an IEEE1394 connection port on a digital camcorder and connected to an IEEE1394 connection port on the computer 112 to facilitate transfer the digital signal generated by digital camcorder to the computer 112 for storage.

Video capture and storage often involves large amounts of data. For instance, to display a single 320×200 frame (64000 pixels) on a computer monitor may require approximately 128 KB of RAM per frame (assuming each pixel requires approximately 2 bytes; 16 bit display). In order to capture ten (10) complete frames per second, more than 1.28 MB per second (i.e., bit rate) will have to be channeled into system RAM of the computer 112. As a result, the available RAM can be used up in a few seconds. However, because of the repetitive nature of the data contained in the video file 116 or audio file 118, compression schemes can be used to eliminate redundant information before it is channeled into the system RAM. Consequently, the actual data stored in the system RAM can be much less than it would be otherwise. After the video or audio files are compressed they can be decompressed for playback. The method of compression and decompression is often referred to as a CODEC. One of the drawbacks in reducing the size of the video or audio file is that there is some loss in video or audio quality. CODECs often require users to define parameters that will be used during the compression and decompression process. The parameters typically include bit rate, frame rate, and resolution. The selection of these parameters can significantly influence the video or audio quality. CODEC functions can be implemented in hardware as a digital signal processor, or in software as a driver.

Figure 1A:
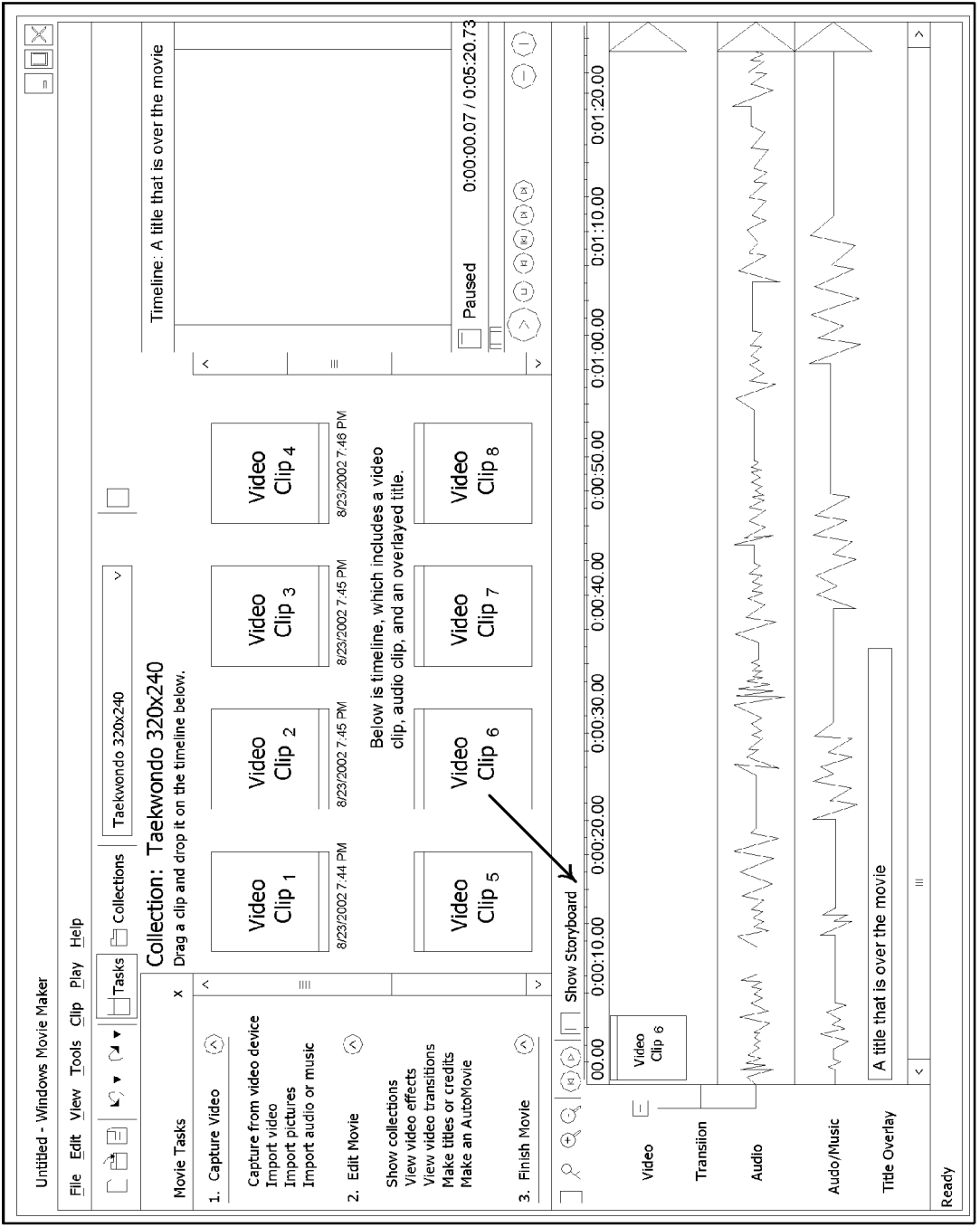
FIG. 1A is a screen shot illustrating a timeline.

A MEA 101 such as Windows® Movie Maker offered by Microsoft, Inc. allows a user to create a consolidated video stream 106 and/or consolidated audio stream 108. The consolidated video stream 106 is representative of a user designed sequence of video frames or images that combine to form a motion video image on a television screen or computer system monitor. The consolidated audio stream 108 is representative of a user designed sequence of audio files, which may or may not correspond to the user designed sequence of video frames, that combine to produce sounds via speakers. In one embodiment, the MEA 101 provides a User-Interface 122 for stepping the user through the process of arranging video files, or video clips, into a desired sequence along a timeline. (See FIG. 1A). The MEA 101 creates a consolidated video stream 106 corresponding to the video clips along the timeline, and/or creates a consolidated audio stream 108 corresponding to the audio clips along the time line. The MEA 101 of the invention further allows the user to indicate a publication target for publishing the consolidated video stream 106 and/or consolidated audio stream 108. In this case, publications refers to saving or transferring the consolidated video stream 106 and/or consolidated audio stream 108 to a particular publication target as a consolidated video file 124 and/or consolidated audio file 126, respectively. For example, consolidated video files or consolidated audio files can be stored on the CRM 120 of the computer 112, or on a destination CRM 128 such as a DVD data disk or hard drive of a remote computer. As another example, the consolidated video stream 106 can be published to the destination CRM 128 via e-mail. By indicating a publication target (e.g., e-mail, CD), the user also determines whether video or audio profiles are selected to achieve the best quality or selected to achieve a best fit to size. (See FIG. 1B).

Although the invention is described below in terms of consolidated video and consolidated audio streams as defined along a timeline, it is contemplated that the invention can be used for publishing consolidated streams with an MEA 100 that utilizes a storyboard or any other method for constructing consolidated streams.

Existing MEAs require the user to select a video profile when capturing the video stream 102 or publishing the consolidated video stream, and select an audio profile when capturing the audio stream 104 or publishing the consolidated audio stream. As used herein, the profile refers to a set of parameters that correspond to a desired format and/or property of the particular stream 102, 104 to be captured, or to a desired format and/or property of the particular consolidated stream 106, 108 to be published. Although format data and property data can often be detected from the V/A source 110 during the capture process, there are instances where the format and/or property data cannot be detected. Moreover, there are instances where the user may prefer not to use the detected format and property due to quality issues or limited storage space. Thus, profile selection allows the user more control over the final output file. Unfortunately, selecting a profile can be a daunting task for users, especially if the user is unfamiliar with resolution, frame rate, bit rate, etc. The MEA 101 according to the invention allows the user to control the capture of video and audio streams 102, 104 by automatically suggesting parameters settings for capture of the video or audio stream 102, 104. Moreover, the MEA 101 according to the invention allows the user control the publication of consolidated video and audio streams 106, 108 by automatically suggesting parameter settings for publication of the consolidated video and audio stream 106,108.

Figure 2:
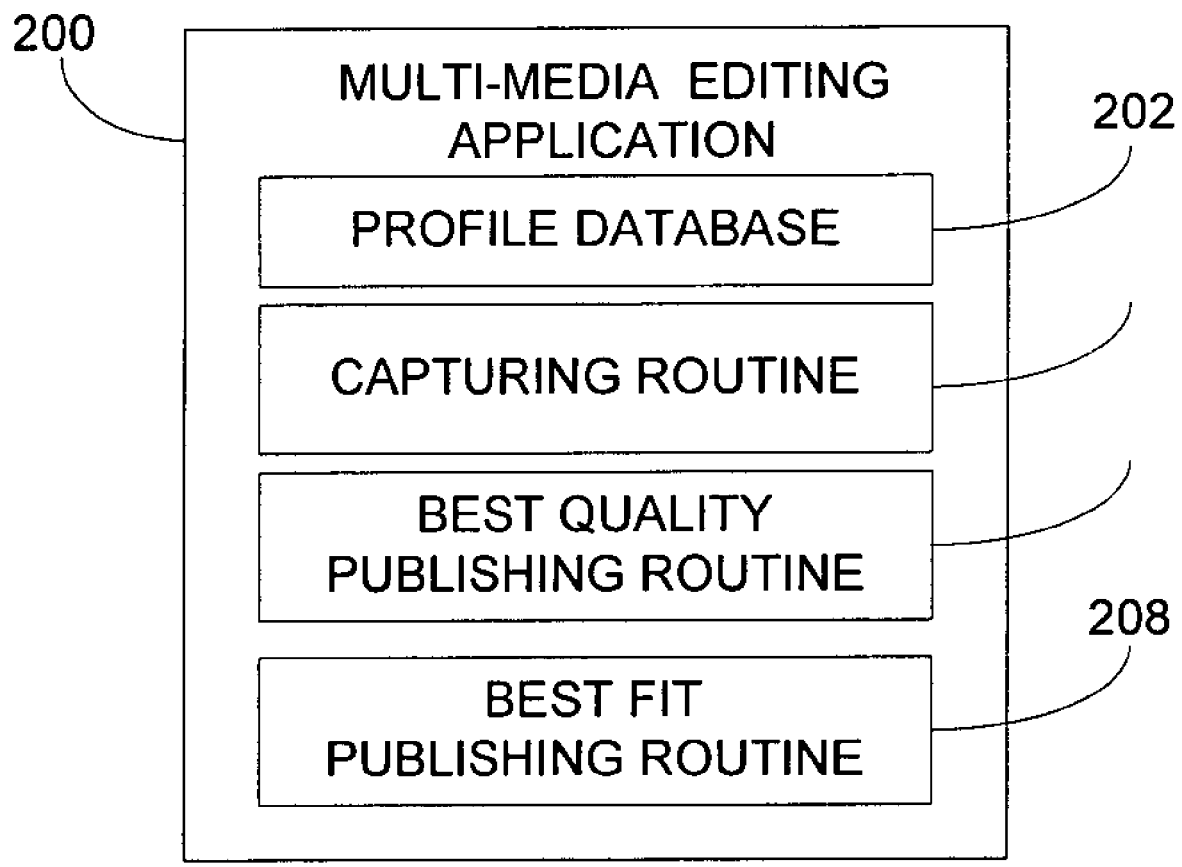
FIG. 2 is an exemplary block diagram illustrating components of a multimedia editing application for implementing the invention.

Referring now to FIG. 2, an exemplary block diagram illustrates basic components of an MEA 200 for implementing the invention. In this example, the basic components of an MEA 200 include a profile database 202, a capturing routine 204, a best-quality publishing routine 206, and a best-fit publishing routine 208.

The profile database 202 stores a list of profiles. Each profile specifies parameters for capturing video or audio streams or for publishing consolidated video or consolidated audio streams. In this case, each parameter specifies a desired format value (e.g., frame rate, resolution) and/or a desired property value (e.g., bit rate) to use for capturing video or audio streams, or to use for publishing consolidated video or consolidated audio streams. The capturing routine 204 includes a set of computer executable instruction for capturing the video stream or audio stream according to parameters specified in one of the list of profiles. The best-quality publishing routine 206 includes a set of computer executable instruction for publishing the consolidated video stream and/or consolidated audio stream according to parameters specified in one of the list of profiles that will produce the best quality video during playback. The best-fit publishing routine 208 includes a set of computer executable instructions for publishing a consolidated video and/or consolidated audio stream according to parameters specified in one of the list of profiles and a maximum file size defined by the user.

Figure 3:
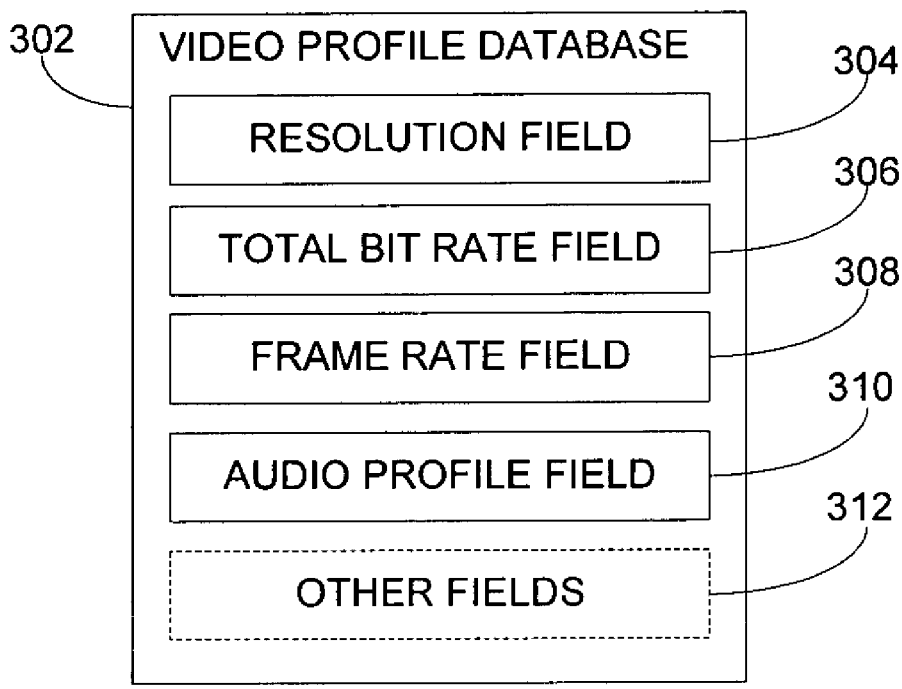
FIG. 3 is an exemplary block diagram illustrating the contents of a profile database storing parameter data for capturing a video stream and/or publishing a consolidated video stream.

Referring next to FIG. 3, an exemplary block diagram illustrates the contents of a video profile database 302 storing data relating to parameters settings for use during the capture of a video stream and/or for use during the publication of the consolidated video stream. Each profile in the video profile database 302 has a resolution field 304, a total bit rate field 306, a frame rate field 308, and an audio profile field 310. (See appendix, Table 1).

The resolution field 304 contains resolution data. The resolution data includes capture and storage information regarding image quality. More specifically, resolution data includes information regarding the amount of information contained in each frame (i.e., image) of the video stream. Resolution is expressed as the number of horizontal pixels times the number of vertical pixels (e.g., 640×480 or 720×480). A higher resolution yields a higher quality image.

The total bit rate field 306 contains total bit rate data. Bit rate indicates the speed at which digital information (binary data) is transferred to the RAM of the computer, and is generally measured in multiple bits per second (e.g., kilobits or thousands of bits per second, Kbps). The total bit rate data includes information regarding the speed at which digital video and audio information corresponding to a particular video stream is transferred to RAM.

The frame rate field 308 contains frame rate data. The frame rate data includes information regarding the number of frames to display per second in a motion video.

The audio profile field 310 contains audio profile data. The audio profile data includes information regarding a corresponding audio profile to use with each video profile.

In one embodiment, the video profile database 302 includes other fields 312 containing data such as buffer window data, smoothness data, or decoding complexity data. Buffer window data includes information regarding how much content can be buffered. For example, if you have a stream with a bit rate of 32 Kbps and a buffer window of 3 seconds, the buffer is sized to hold 3 seconds of 32 Kbps content, or 12,000 bytes (32000 bits per second×3 seconds/8 bits per byte). Smoothness data includes information regarding the smoothness of the motion video during playback. Decoding complexity data includes information regarding error control techniques used to control errors that occur during the transmission and storage of digital data. Such fields are less important for implementing the invention, but can be used for the publication of the consolidated video.

Figure 3A:
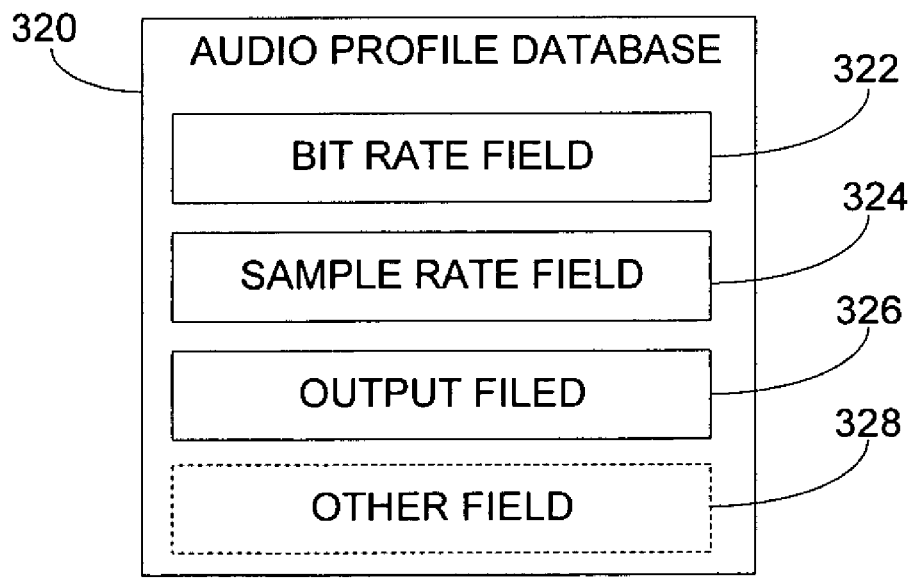
FIG. 3A is an exemplary block diagram illustrating the contents of a profile database storing parameter data for capturing an audio stream and/or publishing a consolidated audio stream.

Referring next to FIG. 3A, an exemplary block diagram illustrates the contents of an audio profile database 320 storing data relating to parameters settings for use during the capture of an audio stream or during the publication of the consolidated audio stream. Each profile in the audio profile database 320 has a bit rate field 322, an audio sample rate field 324, and an output field 326. (See appendix, Table 2).

The bit rate field 322 contains audio bit rate data. The audio bit data includes information regarding the speed at which digital audio information is transferred to the RAM of the computer.

A sample rate field 324 contains audio sample rate data. The audio sample rate is the frequency at which samples are taken from an analog audio stream during the conversion of the analog signal to a digital format. The higher the sampling rate the more the digitized audio stream matches the original sound during playback. Thus, the audio sample rate data includes information regarding the frequency with which samples are taken from an analog audio stream. For example, common sampling rates like 44.1 KHz indicates that the analog audio signal is sampled 44100 times per second to convert the analog sound (source) into a digital stream.

The output field contains 326 output data. The output data includes information regarding whether the audio stream is stereo or mono.

In one embodiment, the audio profile database 320 includes other fields 328 such as a buffer window field, which is less important, but can be used for the publication of the consolidated audio stream.

Figure 4:
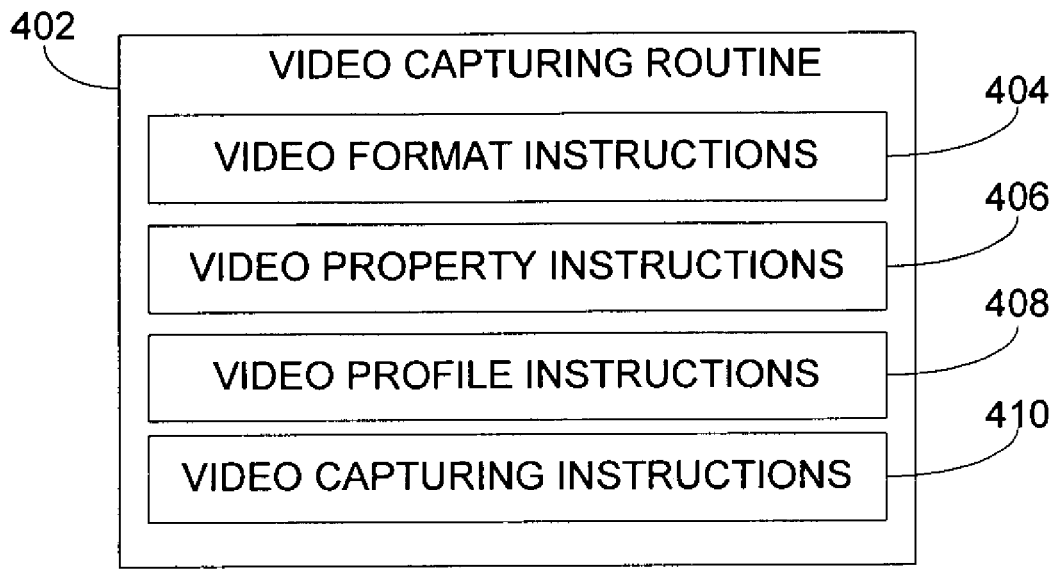
FIG. 4 is an exemplary block diagram illustrating the contents of the video capture routine comprising computer executable instructions for capturing video streams.

Referring next to FIG. 4, an exemplary block diagram illustrates the contents of a video capture routine 402 comprising computer executable instructions for capturing a video stream.

Video format instructions 404 include determining the format of the video stream being captured. In this embodiment, determining the format includes determining the aspect ratio, the frame rate, the resolution, and/or the frame display mode of the video stream. The frame rate corresponds to the frame per second (fps) rate at which the individual series of video frames will be displayed during playback on a viewing device (not shown) such as a television or computer monitor. Generally, the geographic region in which the video stream is targeted for playback determines the frame rate of the video stream. For example, a video stream targeted for playback in Europe will generally have a frame rate of approximately 25 fps, which corresponds to an Phase Alternating Line (PAL) format. In contrast, a video stream targeted for playback in North America will generally have a frame rate of approximately 30 fps, which corresponds to an National Television Systems Committee (NTSC) format. PAL and NTSC are commonly referred to as TV standards.

The aspect ratio indicates the width to height proportion of a video frame. For example, traditional television sets have a 4:3 aspect ratio and video frames displayed on traditional television appear almost square in appearance. In contrast, widescreen television sets have a 16:9 aspect ratio, and video frames displayed on widescreen television sets appear more rectangular. As described above, the resolution indicates a quality of the image and is typically expressed horizontal pixels times vertical pixels. The frame display mode indicates whether the video frame is interlaced or progressive scan. For example, when a television set displays its analog video signal, it displays the odd lines (the odd field) first and then the even lines (the even field). The "odd field" and the "even field" together form a frame. For NTSC, approximately sixty of these fields are displayed every second. This is called "interlaced video." However, digital video displays use progressive scan to update the screen. With this method, the screen is not separated into fields. Rather, each line is displayed in sequence, from top to bottom. The entire frame is displayed 30 times every second. This is also called "non-interlaced video."

In another embodiment, the video format instructions 404 include automatically detecting the format of the captured video stream by analyzing encoded data included the video stream as received from the video source. For example, it is possible to detect from a digital camcorder driver in most cases whether the camcorder is NTSC or PAL (i.e., the frame rate). Because there may be cases where the camcorder returns both NTSC and PAL or the value returned is incorrect, the video format instructions 404 may include assigning a default format for the video stream. That is, in the event the format of the video stream cannot be determined the video format instructions 404 designate the format. For example, if the TV standard (i.e., PAL or NTSC) of the video stream cannot be determined, the video format instructions 404 assign a default TV standard. In one such embodiment, the video includes retrieving the region setting (i.e., country) from an operating system such as Windows XP®. The video further include retrieving from a table (not shown) that lists TV standards by country, the TV standard that corresponds to the country retrieved from the region setting of the operating system. In another embodiment, during the capture of the video stream the format of the video stream is determined on a frame-by-frame basis. That is, no conversion between formats takes place even if formats of the frames included in the video stream are mixed. For example, during capture of a video stream including 16:9 and 4:3 frames, frames that have an aspect ratio of 16:9 will be determined to have an aspect ratio of 16:9 and frames that have an aspect ratio of 4:3 will be determined to have an aspect ration of 4:3.

In another embodiment, the user designates a default setting using a Tools/Options menu of the MEA. Thereafter, the video format instructions 404 designate the format of the captured video stream to correspond to the default setting designated in the Tools/Options menu. For example, the MEA may designate 4:3 as the default for the aspect ratio and designate interlaced as the default for the frame display mode within Tools/Options menu. (See FIG. 4B).

Video property instructions 406 include determining one or more properties of the video stream being captured. In this case, determining one or more properties includes determining the total bit rate of the video stream. In one embodiment, properties of the video stream being captured are determined from encoded data included in the video stream. For example, the bit rate can be determined from data encoded into the video stream by the video source (e.g., digital camera driver) or the capture tool 114 (i.e., capture card). Video property instructions 406 further include determining one or more properties of the audio stream being captured. In this case, determining one or more properties includes determining the bit rate of the audio stream. In one embodiment, properties of the video stream being captured are determined from encoded data included in the video stream. For example, the resolution and bit rate can be determined from resolution data encoded into the video stream by the video source (e.g., digital camera driver) or the capture tool 114 (i.e., capture card).

Video profile instructions 408 include selecting one of a list of video profiles such as described above in reference to FIG. 3. The purpose of using profiles is to capture the video stream at a resolution and frame rate that is not higher than the video source, while at the same time capturing as much information as possible (i.e., not throwing away resolution). In one embodiment, the profile selection is dependent on the determined format. For example, if the format of a digital video stream is determined to be NTSC, a profile specifying a resolution of 720×480 and a frame rate of 30 fps may be selected. Alternatively, if the format of a digital video stream is determined to be PAL, a profile specifying a resolution of 720×576 and 25 fps may be selected. In another embodiment, the profile selection is dependent on the determined video source. For example, if the video source is a web camera a profile specifying the determined resolution and the determined frame may be selected.

Video capturing instructions 410 include capturing the video stream according to the selected profile. In this case, capturing refers to the process of storing video data and audio data on the computer in accordance with parameters specified in the selected video profile. In one embodiment, video and sound data contained in the video stream are synchronized together, and then stored on the hard drive in a standard file format such as Windows Media™ Video (.WMV).

Figure 4A:
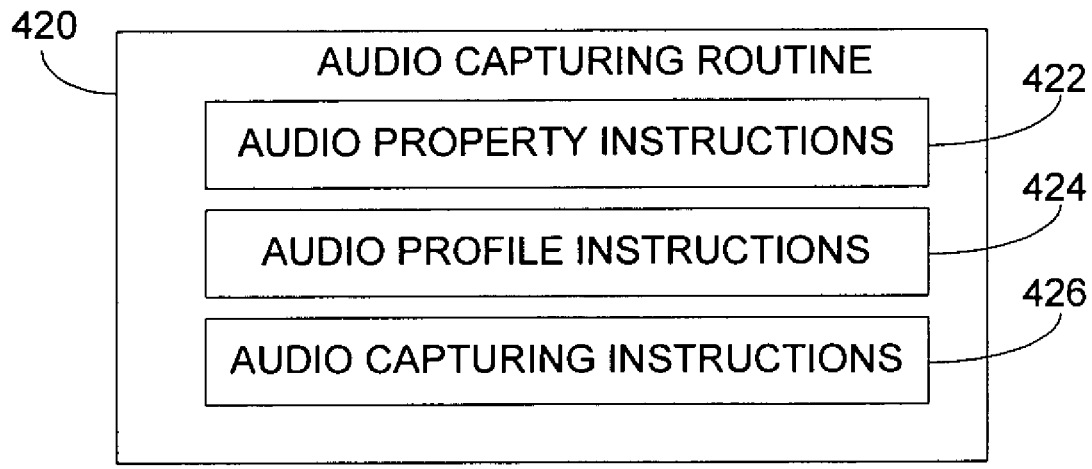
FIG. 4A is an exemplary block diagram illustrating the contents of the audio capture routine comprising computer executable instructions for capturing audio streams.
Figure 4B:
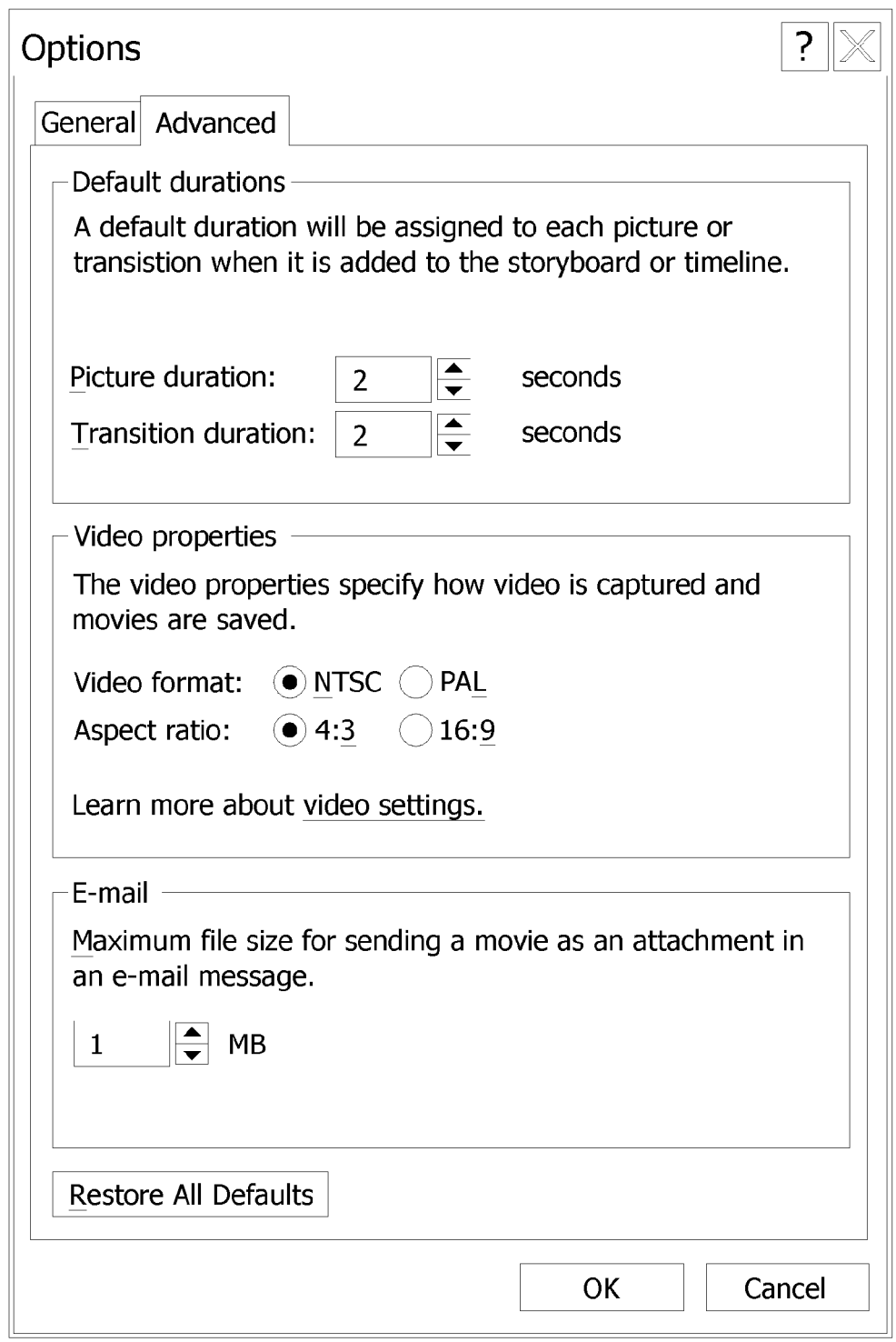
FIG. 4B is a screen shot illustrating a Tools/Options menu of the MEA for setting defaults.

Referring now to FIG. 4A, an exemplary block diagram illustrates the contents of audio capture routine 420 comprising computer executable instructions for capturing an audio stream.

Audio property instructions 422 include determining one or more properties of the particular audio stream being captured. In this case, determining one or more properties includes determining the bit rate of the audio stream. In one embodiment, properties of the audio stream being captured are determined from encoded data included in the audio stream. For example, the bit rate and output mode (i.e., stereo or mono) can be determined from resolution data or other metadata encoded into the audio stream by the audio source.

Audio profile instructions 424 include selecting one of a list of profiles such as described above in reference to FIG. 3A. In one embodiment, the audio profile selection is dependent on the audio source. For example, if the audio stream is generated by a digital camcorder an audio profile specifying the sample rate used by the digital camcorder is selected. In another embodiment, the audio profile instructions 424 include designating a audio profile. For example, if the audio source is a microphone an audio profile specifying a sample rate of 44.1 khz and a stereo output mode may be selected.

Audio capturing instructions 426 include capturing the audio stream according to the selected profile. In this case, audio capturing refers to the process of storing audio data on the computer in accordance with parameters specified in the selected audio profile. In one embodiment, sound data contained in the audio stream is stored on the hard drive in a standard file format such Windows Media™ Audio (WMA).

After the video stream or audio stream has been captured, the MEA can be used to publish a consolidated video stream or consolidated audio stream.

Figure 5:
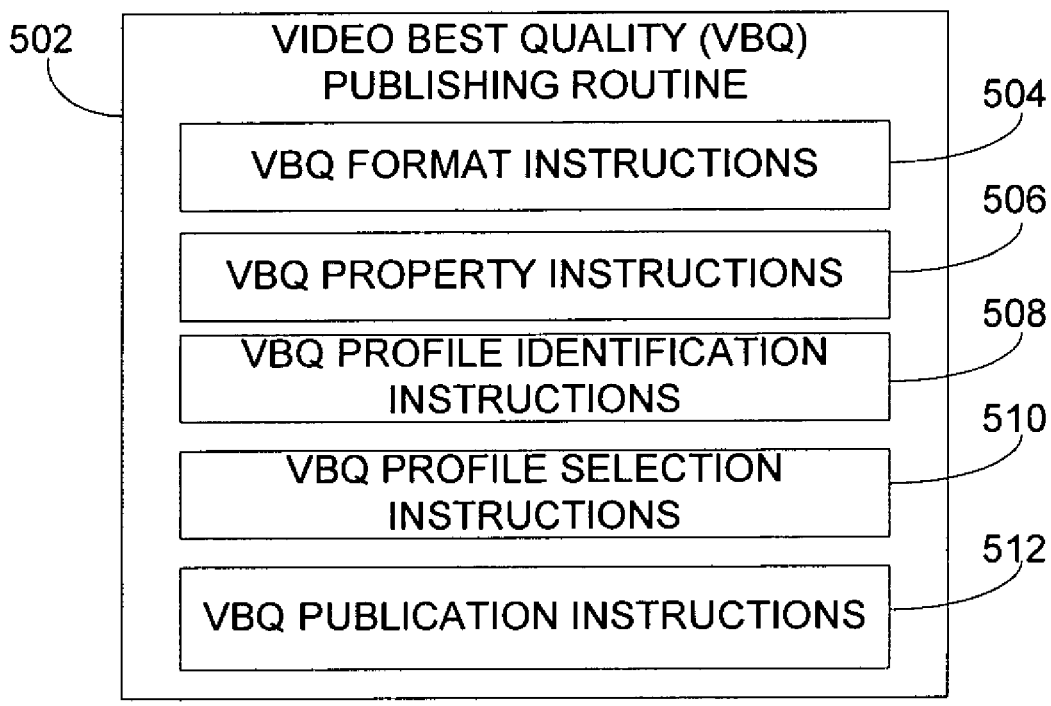
FIG. 5 is an exemplary block diagram illustrating the contents of a publishing routine comprising computer executable instructions for publishing the consolidated video stream to provide the best quality video during playback.

Referring now to FIG. 5, an exemplary block diagram illustrates the contents of a video best quality publishing routine 502 comprising computer executable instructions for publishing a consolidated video stream that provides the best quality video during playback.

Video best-quality format instructions 504 include determining the format of the consolidated video stream to be published. In this case, determining the format includes determining the aspect ratio, the frame rate, resolution and/or the frame display mode of the consolidated video stream. In one embodiment, the format of the consolidated video stream is the same as the format of the one or more captured video frames from which the video stream is defined. If the video frames that define the consolidated video have different formats, video best-quality format instructions 504 may include assigning a default format to consolidated video such as described above in reference to FIG. 4. In one embodiment, the resolution of the consolidated video stream is determined from a maximum resolution of one or more video clips that define the consolidated video stream. In other words, each video clip along the timeline is examined to determine its resolution. Thereafter, the maximum resolution can be determined by comparing the resolution of each frame in the clip to determine maximum and minimum values. One method of comparing resolutions involves calculating the number of pixels in each frame. This achieved by multiplying the width by the height. For example, a frame with a 420×420 resolution has a total of 176,400 pixels, and a frame with a 480×360 resolution has a total of 172,360 pixels. Therefore, the resolution of the 420×420 frame is greater than the 480×360 frame. In the event the format of the video stream cannot be determined from examining the timeline, the video best-quality format instructions 504 can designate the format. For example, if the resolution and bit rate of the video content cannot be determined, the video best-quality property instructions 506 may designate the resolution as 320×240.

In another embodiment, the user designates a default setting using a Tools/Options menu of the multimedia editing application. Thereafter, the video best-quality format instructions 504 designate the format of the consolidated video stream to correspond to the default setting as designated in the Tools/Options menu. In one such embodiment, the aspect ratio (e.g., 4:3 or 16:9) and the frame display mode (i.e., interlaced or progressive) is determined solely from Tools/Options settings as designated by the user or as designated as a default within the MEA. For example, the MEA may designate 4:3 as the default for the aspect ratio and designate interlaced as the default for the frame display mode within Tools/Options menu. As another example, if the frame display mode (i.e., TV standard) is determined to be in an NTSC format the resolution is designated as 720×480. Alternatively, if the frame display mode is determined to be in a PAL format the resolution is designated as 720×576.

Video best-quality property instructions 506 include determining one or more properties of the consolidated video stream to be published. In this instance, determining one or more properties includes determining the bit rate of the consolidated video stream. In one embodiment, the bit rate of the consolidated video stream is determined from a maximum bit rate of one or more video clips that define the consolidated video stream, respectively. In other words, each video clip along the timeline is examined to determine its resolution and bit rate. Thereafter, the maximum bit rate can be determined by comparing bit rate of each frame in the clip to determine maximum and minimum values. In an alternative embodiment, the video best-quality property instructions 506 include assigning a default property for the consolidated video stream. That is, in the event the property of the video stream cannot be determined from examining the timeline, the video best-quality property instructions 506 designate the property. For example, if the bit rate of the video content cannot be determined, the video best-quality property instructions 506 may designate the bit rate as 304 Kbps.

Video best-quality identifying instructions 508 include identifying a set of video profiles that corresponds to the determined format and the determined property of the consolidated video stream. In this case, the set of video profiles is identified from a list of video profiles such as stored in the profile database described above in reference to FIG. 3. As described above, the profile database includes resolution data. The set of video profiles may include two or more of the list of video profiles each specifying the timeline resolution. Alternatively, the set of profiles may include a first list of profiles and a second list of profiles. The first list of profiles includes the list of profiles specifying the same first resolution, wherein the specified first resolution is greater than or equal to timeline resolution. The second list of profiles includes the list of profiles each specifying the same second resolution, wherein the specified second resolution less than or equal to the timeline resolution. In other words, the timeline resolution falls between the first resolution specified in the first list of profiles and the second resolution specified in second list of profiles. The video best-quality identifying instructions 508 further include identifying a first profile and a second profile from the identified set of video profiles. The first profile specifies a bit rate less than the determined bit rate of the consolidated video stream. The second profile specifies a bit rate greater than the determined resolution of the consolidated video stream. (See appendix, Example 1).

Video best-quality selection instructions 510 include selecting one of the lists of profiles as a function of the difference between the identified first list of profiles and the identified second list of profiles. In one embodiment, the video best-quality selection instructions 510 include selecting one of the identified lists of profiles as function of the difference between the first resolution specified in the first list of profiles and the second resolution specified in the second list of profiles. For example, video best-quality selection instructions 510 may include the following instructions:

If $T_R <= L_R + 0.1*(H_R - L_R)$, select list of profiles with the lower resolution, If $T_R > L_R + 0.1*(H_R - L_R)$, select list of profiles with the higher resolution, If $T_R$ is lower than the lowest resolution in the profile database, select video profile with the lowest resolution in the database, or If $T_R$ is higher than the highest resolution in the database, select video profile with the highest resolution in the profile database;

where $T_R$ is the maximum resolution determined from the timeline, $L_R$ is the second resolution specified by the second list of profiles, and $H_R$ is the first resolution specified by the first list of profiles. Notably, all other resolutions in the profile database are either less than or equal to $L_R$ or greater than or equal to $H_R$. The video best-quality selection instructions 510 further include selecting one of the video profiles as function of the difference between the identified first profile and the identified second profile. In another embodiment, the video best-quality selection instructions 510 include selecting one of the video profiles as function of the difference between the bit rate specified in the first profile and the bit rate specified in the second profile. For example, video best-quality selection instructions 510 may include the following instructions:

If $T_{BR} <= L_{BR} + 0.1*(H_{BR} - L_{BR})$, select video profile with the lower bit rate, If $T_{BR} > L_{BR} + 0.1*(H_{BR} - L_{BR})$, select video profile with the higher bit rate, If $T_{BR}$ is lower than the lowest bit rate in the list of profiles, select video profile with the lowest bit rate in the list of profiles, or If $T_{BR}$ is higher than the highest bit rate in the list of profiles, select video profile with the highest bit rate in the list of profiles;

where $T_{BR}$ is the maximum bit rate determined from the timeline, $L_{BR}$ is the bite rate specified by the second profile, and $H_{BR}$ is the bite rate specified by the first profile. Notably, all other bit rates in the profile database are either less than or equal to $L_{BR}$ or greater than or equal to $H_{BR}$. In the case where the set of profiles includes at least two of the list of video profiles each specifying the same resolution as the determined resolution for the consolidated video stream, the first profile specifying a bit rate closest to the determined bit rate is selected. (See appendix, Example 1)

Video best-quality publishing instructions 512 include publishing the consolidated video stream according to the selected profile. In this embodiment, video best-quality publish instructions 512 includes local publishing and remote publishing. Local publishing includes the process of saving and/or copying the consolidated video stream to the hard drive of the computer that stores the MEA used to create the consolidated video stream. In this case, remote publishing includes the process of saving and/or copying the consolidated video stream to an external CRM where storage space (i.e., file size) is not an issue. In one embodiment, the user indicates a publication target prior to the execution of the selection instructions. (See FIG. 1B). By indicating a publication target (e.g., e-mail, CD), the user determines whether video profiles are selected to achieve the best-quality or selected to achieve a best fit to size.

Figure 5A:
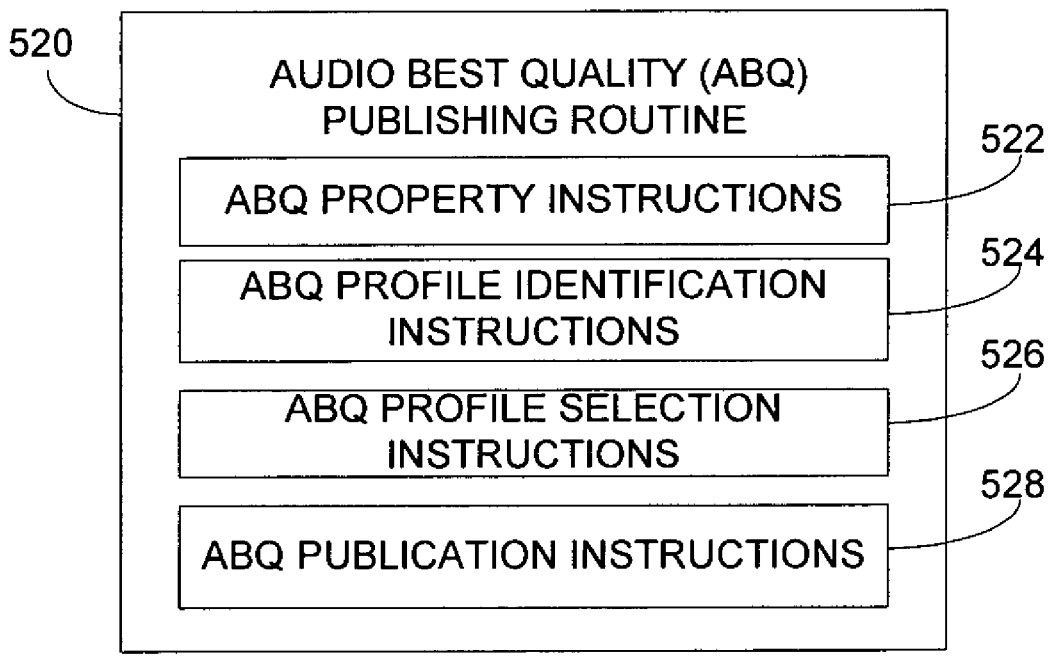
FIG. 5A is an exemplary block diagram illustrating the contents of a publishing routine comprising computer executable instructions for publishing the consolidated audio stream to provide the best quality audio during playback.

Referring now to FIG. 5A, an exemplary block diagram illustrates the contents of an audio best-quality publishing routine 520 comprising computer executable instructions for publishing a consolidated audio stream that provides the best-quality audio during playback.

Audio best-quality property instructions 522 include determining one or more properties of the consolidated audio stream to be published. In this instance, determining one or more properties includes determining the bit rate of the consolidated audio stream. In one embodiment, the bit rate of the consolidated audio stream is determined from a maximum resolution and a maximum bit rate of one or more audio clips that define the consolidated audio stream. In other words, each audio clip along the timeline is examined to determine its bit rate. Thereafter, the maximum bit rate can be determined by comparing the bit rate of each clip to determine maximum and minimum values. In an alternative embodiment the audio best-quality property instructions 522 include assigning a default property for the consolidated audio stream. That is, in the event the property of the audio stream cannot be determined the audio best-quality property instructions 522 designate the property.

Audio best-quality identifying instructions 524 include identifying a set of audio profiles that correspond to the determined property of the consolidated audio stream. In this case, the set of audio profiles is identified from a list of audio profiles such as stored in the audio profile database described above in reference to FIG. 3A. As described above, the audio profile database includes bit rate data. In one embodiment, the set of profiles includes a first profile and a second profile from the identified set of audio profiles. The first profile specifies a bit rate less than the determined bit rate of the consolidated audio stream. The second profile specifies a bit rate greater than the determined bit rate of the consolidated audio stream. (See appendix, Example 2).

Audio best-quality selection instructions 526 include selecting one of the audio profiles as function of the difference between the identified first profile and the identified second profile. In one embodiment, audio best-quality selecting instructions 526 include selecting one of the audio profiles as function of the difference between the bit rate specified in the first profile and the bit rate specified in the second profile. For example, audio best-quality selection instructions 526 may include the following instructions:

If $T_{BR} <= L_{BR} + 0.1*(H_{BR} - L_{BR})$, select audio profile with the lower bit rate, If $T_{BR} > L_{BR} + 0.1*(H_{BR} - L_{BR})$, select audio profile with the higher bit rate, If $T_{BR}$ is lower than the lowest bit rate in the profile database, select audio profile with lowest bit rate in the profile database, or If $T_{BR}$ is higher than the highest bit rate in the profile database, select audio profile with highest bit rate in the profile database;

where $T_{BR}$ is the maximum bit rate determined from the timeline, $L_{BR}$ is the bite rate specified by the second profile, and $H_{BR}$ is the bite rate specified by the first profile. (See appendix, Example 2). Notably, all other bit rates in the audio profile database are either less than or equal to $L_{BR}$ or greater than or equal to $H_{BR}$.

Audio best-quality publishing instructions 528 include publishing the consolidated audio stream according to the selected profile. In this embodiment, audio best-quality publish instructions include local publishing and remote publishing. Local publishing includes the process of saving and/or copying the consolidated audio stream to the hard drive of the computer that stores the MEA used to create the consolidated audio stream. In this case, remote quality publishing includes the process of saving and/or copying the consolidated audio stream to an external CRM where storage space (i.e., file size) is not an issue. In one embodiment, the user indicates a publication target prior to the execution of the selection instructions. By indicating a publication target (e.g., e-mail, CD), the user determines whether audio profiles are selected to achieve the best-quality or selected to achieve a best fit to size.

Figure 6:
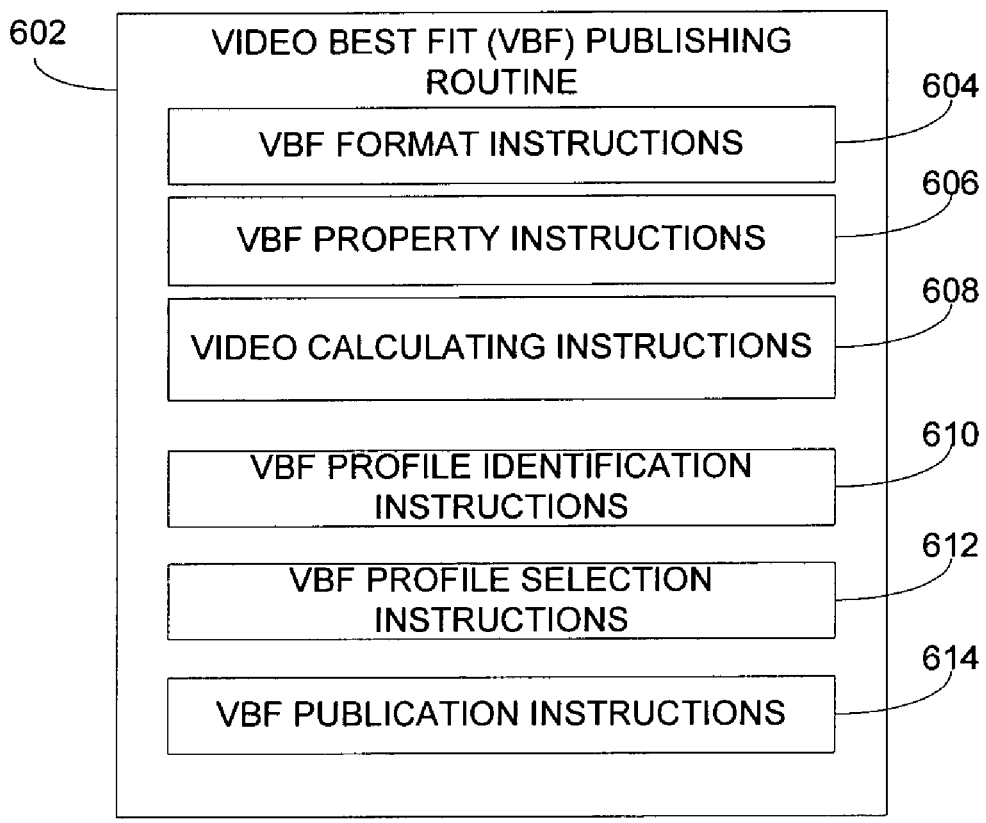
FIG. 6 is an exemplary block diagram illustrating the contents of a publishing routine comprising computer executable instructions for publishing a consolidated video stream to fit a designated file size.

Referring now to FIG. 6, an exemplary block diagram illustrates the contents of a video best fit publishing routine 602 comprising computer executable instructions for publishing a consolidated video stream that will best fit a designated file size.

Video best-fit format instructions 604 include instructions such as described above in reference to video best-quality format instructions 504. Video best-fit property instructions 606 include instructions such as described above in reference to video best-quality property instructions 506.

Video calculating instructions 608 include calculating a target bit rate for the consolidated video stream. In one embodiment, the target bit rate is determined as a function of a target file size and a total length of time required for playback of the consolidated video stream. For example, the target bit rate can be determined from the following equation:

$$TT_{BR}=F_S/L_{CV}; \quad (1)$$

where $TT_{BR}$ is the total target bit rate, $F_S$ is file size in bits, and $L_{CV}$ is the length of the consolidated video stream in seconds. (See appendix, Example 3). The video calculating instructions 608 further include retrieving a target file size and determining the length of time that corresponds to the consolidated video stream. The target file size can be defined by the user via the MEA or set to a default target file size by the MEA. In one embodiment, the MEA provides an user interface that allows the user to enter a desired file size and/or allows the user to select a publication target such as a CD or e-mail. (See FIG. 5B) In the latter, the MEA can automatically designate the target file size based on the remaining disk space available on the publication target. For example, if the publication target is a CD the MEA reads the CD to determine the amount of free space on the CD and designates the target file size to equal the free space. In one embodiment, the MEA subtracts some amount (e.g., 50 MB) from the determined free space for finalizing the disc, closing the session, etc. Alternatively, if the publication target is e-mail, the MEA may designate the file size to conform to limits as determined by the e-mail provider (e.g., 1 MB to 10 MB). Alternatively, if the publication target is e-mail and the user does not designate a file size, the MEA may assign a default file size (e.g., 1 MB). The length of time that corresponds to the consolidated video stream can be determined by summing the playback time of the individual video clips along the time line.

Video best-fit identifying instructions 610 include identifying a set of video profiles corresponding to the determined format and the target bit rate of the consolidated video stream. The video best-fit identifying instructions 610 further include identifying the set of video profiles from a list of video profiles such as stored in the profile database described above in reference to FIG. 3. As described above, the video profile database includes bit rate data. The set of profiles may include at least two the list of video profiles each specifying a bit rate equal to the target bit rate. Alternatively, the set of profiles may include a first list of profiles and a second list of profiles. The first list of profiles includes the list of profiles specifying the same first bit rate, wherein the specified first bit rate is greater than or equal to the target bit rate. The second list of profiles includes the list of profiles each specifying the same second bit rate, wherein the specified second bit rate is less than or equal to the target bit rate. In other words, the target bit rate falls between the first bit rate specified in the first list of profiles and the second bit rate specified in second list of profiles.

Video best-fit selection instructions 612 include selecting one of the list of video profiles as a function of the difference between the identified first list of profiles and the identified second list of profiles. In this embodiment, the video best-fit selection instructions 612 include selecting one of the identified list of profiles as function of the difference between the first bit rate specified in the first list of profiles and the second bit rate specified in the second list of profiles. For example, the video best-fit selection instructions 612 may include the following instructions:

If $TT_{BR} <= L_{BR}+0.1*(H_{BR}-L_{BR})$, select list of video profiles with the lower bit rate, If $TT_{BR} > L_{BR}+0.1*(H_{BR}-L_{BR})$, select list of video profiles with the higher bit rate, If $TT_{BR}$ is lower than the lowest bit rate in the profile database, select video profile with the lowest bit rate in the video profile database, or If $TT_{BR}$ is higher than the highest bit rate in the profile database, select video profile with the highest bit rate in the profile database;

where $TT_{BR}$ is the calculated total target bit rate, $L_{BR}$ is the second bite rate specified by the second list of profiles, and $H_{BR}$ is the first bite rate specified by the first list of profiles. (See appendix, Example 3). Notably, all other bit rates in the audio profile database are either less than or equal to $L_{BR}$ or greater than or equal to $H_{BR}$. The video best-fit selection instructions 612 further include selecting one of the video profiles as a function of the difference between the identified first profile and the identified second profile. In one embodiment, the video best-fit selection instructions 612 include selecting one of the profiles as function of the difference between the resolution specified in the first profile and the resolution specified in the second profile. For example, video best-fit selection instructions 612 may include the following:

If $T_R <= L_R+0.1*(H_R-L_R)$, select video profile with the lower resolution,

If $T_R > L_R+0.1*(H_R-L_R)$, select video profile with the higher resolution,

If $T_R$ is lower than the lowest resolution in the list of video profiles, select the video profile with lowest resolution, or If $T_R$ is higher than the highest resolution in the list of video profiles, select the profile with the highest resolution;

where $T_R$ is the maximum resolution determined from the timeline, $L_R$ is the resolution specified by the second profile, and $H_R$ is the resolution specified by the first profile. Notably, all other resolutions in the profile database are either less than or equal to $L_R$ or greater than or equal to $H_R$. In the case where the set of profiles includes at least two of the list of video profiles each specifying the same bit rate as the target bit rate for the consolidated video stream, the profile specifying a resolution closest to the determined resolution is selected. (See appendix, Example 3).

Video best-fit publishing instructions 614 include publishing the consolidated video stream according to the profile selected by the selection instructions 612. In this embodiment, video best-fit publish instructions 614 include remotely publishing the consolidated video stream or publishing the consolidated video stream according to a user defined file size. In this instance, remote publishing refers to the process of saving, copying and/or transferring the consolidated video stream to external CRM such as a CD, DVD data disk or remote computer (via e-mail) where file size is an issue.

In one embodiment, the video best fit publishing routine 602 executes the video best quality routine 502 to compare the target bit rate of the video profile for best-fit (i.e., $TT_{BR}$) to the determined bit rate of the video profile for best quality (i.e., $T_{BR}$). For example, if $TT_{BR}$ is greater than $T_{BR}$, as determined from the video best quality routine 502, then the profile with bit rate equal to $T_{BR}$ is selected since this is the maximum quality. In other words, it is a waste of disk space to publish the consolidated video stream using a bit rate that provides a quality higher than the maximum quality of the content on the timeline.

Figure 6A:
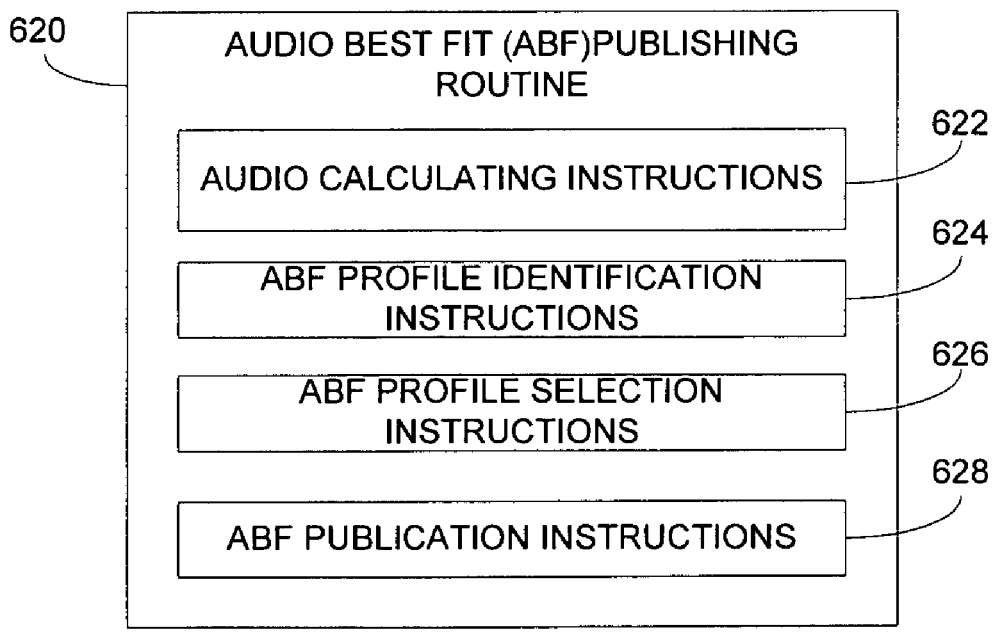
FIG. 6A is an exemplary block diagram illustrating the contents of a publishing routine comprising computer executable instructions for publishing a consolidated audio stream to fit a designated file size.

Referring now to FIG. 6A, an exemplary block diagram illustrates the contents of an audio best fit publishing routine 620 comprising computer executable instructions for publishing a consolidated audio stream that will best fit a designated file size.

Audio calculating instructions 622 include calculating a target bit rate for the consolidated audio stream. In one embodiment, the target bit rate is determined as a function of a target file size and a total length of time required for playback of the consolidated audio stream. For example, the target bit rate can be determined from the following equation:

$$TT_{BR}=F_S/L_{CA}; \qquad (2)$$

where $TT_{BR}$ is the total target bit rate, $F_S$ is file size in bits, and $L_{CA}$ is the length of the consolidated audio stream in seconds. (See appendix, Example 4). The audio calculating instructions 622 further include retrieving a target file size and determining the length of time that corresponds to the consolidated audio stream. The target file size can be defined by the user via the MEA or set to default by the MEA. In one embodiment, the MEA provides a user interface that allows the user to enter a desired file size and/or allows the user to select a publication target such as a CD or e-mail. (See FIG. 1B). In the latter case, the MEA can automatically designate the target file size based on the publication target. For example, if the publication target is a blank CD the MEA may designate the file size as 650 MB (i.e., 700 MB–50 MB). Alternatively, if the publication target is e-mail, the MEA may designate a default file size as 1 MB. The length of time that corresponds to the consolidated audio stream can be determined by summing the playback time of the individual audio clips along the time line. (See appendix, Example 4).

Audio best-fit identifying instructions 624 include identifying a set of audio profiles corresponding to the target bit rate of the consolidated audio stream. The audio best-fit identifying instructions 624 further include identifying the set of audio profiles from a list of audio profiles such as stored in the audio profile database described above in reference to FIG. 3A. As described above, the audio profile database includes bit rate data. In one embodiment, the set of profiles includes a first profile and a second profile from the identified set of audio profiles. The first profile specifies a bit rate less than the calculated bit rate of the consolidated audio stream. The second profile specifies a bit rate greater than the calculated bit rate of the consolidated audio stream.

Audio best-fit selection instructions 626 include selecting one of the lists of profiles as a function of the difference between the identified first profile and the identified second profile. In this embodiment, the audio best-fit selection instructions 626 include selecting one of the identified profiles as function of the difference between the bit rate specified in the first profile and the bit rate specified in the second profile. For example, the audio best-fit selection instructions 626 may include the following instructions:

If $TT_{BR}<=L_{BR}+0.1*(H_{BR}-L_{BR})$, select audio profile with the lower bit rate, If $TT_{BR}>L_{BR}+0.1*(H_{BR}-L_{BR})$, select audio profile with the higher bit rate, If $TT_{BR}$ is lower than the lowest bit rate in the database, select audio profile with the lowest bit rate in the profile database, or If $TT_{BR}$ is higher than the highest bit rate in the database, select the audio profile with the highest bit rate in the profile database;

where $TT_{BR}$ is the calculated total target bit rate, $L_{BR}$ is the bite rate specified by the second profile, and $H_{BR}$ is the bite rate specified by the first profile. (See appendix, Example 4). Notably, all other bit rates in the audio profile database are either less than or equal to $L_{BR}$ or greater than or equal to $H_{BR}$.

Audio best-fit publishing instructions 628 include publishing the consolidated video stream according to the selected profile, and are similar to the video best-quality publishing instructions discussed above in reference to FIG. 5A.

Figure 7:
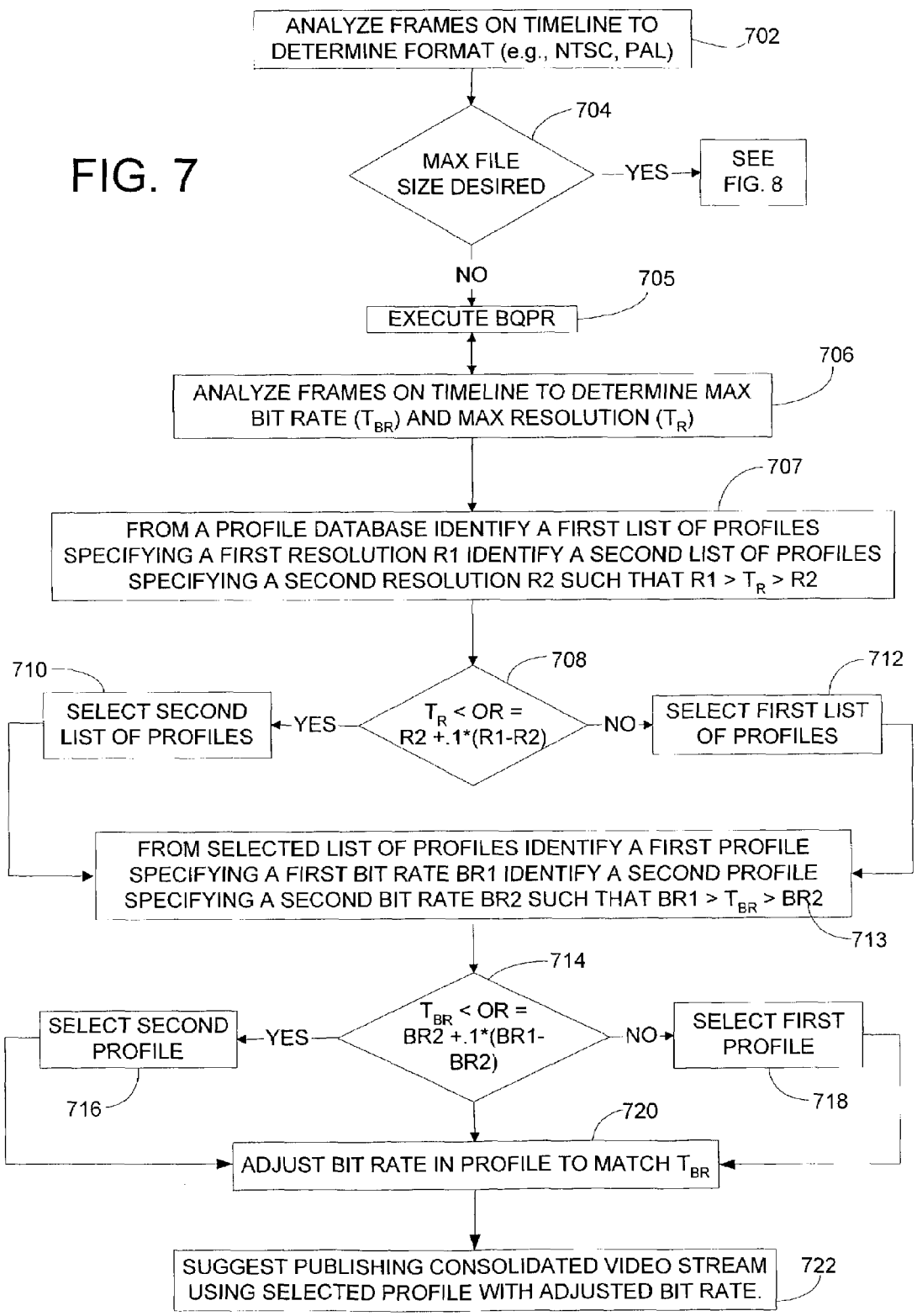
FIG. 7 is an exemplary flow chart illustrating operation of the best-quality video publication routine as described in reference to FIG. 5.

Referring next to FIG. 7, an exemplary flow chart illustrates the publication of the consolidated video stream as described in reference to FIG. 5. The frames along the timeline that define the consolidated video are analyzed to determine a format to be used (i.e., NTSC, PAL, 4:3, 16:9) at 702. At 704 the user indicates whether a maximum file size is desired (e.g., e-mail, or save to CD). If a maximum file size is desired, the best-fit publication routine is executed (BFPR) (see FIG. 8). If a maximum file size is not desired, the best quality publication routine (BQPR) is executed at 705. At 706 the frames along the timeline that define the consolidated video are analyzed to determine the maximum bit rate, $T_{BR}$, and maximum resolution, $T_R$. At 707, a first list of profiles specifying a first resolution, R1, and a second list of profiles specifying a second resolution, R2, are identified such that $T_R$ is between R1 and R2, where R2 is less than $T_R$. The BQPR determines whether $T_R$ is less than or equal to R2 plus a resolution error margin (i.e., $0.1*(R1-R2)$) at 708. If $T_R$ is less than or equal to R2 plus the resolution error margin, then the BQPR selects the list of profiles specifying R2 at 710. If $T_R$ is greater than R2 plus the resolution error margin, then the BQPR selects the list of profiles specifying R1 at 712. At 713, a first profile specifying a first bit rate, BR1, and a second profile specifying a second bit rate, BR2, are identified from the selected list of profiles such that $T_{BR}$ is between BR1 and BR2, where BR2 is less than $T_{BR}$. The BQPR determines whether $T_{BR}$ is less than or equal to BR2 plus a bit rate error margin (i.e., $0.1*(BR1-BR2)$) at 714. If $T_{BR}$ is less than or equal to BR2 plus the bit rate error margin, then the BQPR selects the profile specifying BR2 at 716. If $T_{BR}$ is greater than BR2 plus the bit rate error margin, then the BQPR selects the profile specifying BR1 at 718. At 720, the bit rate specified in the profile selected at 716 or 718 is adjusted to specify the maximum bit rate $T_{BR}$. The resolution specified in the profile selected at 716 or 718 and the adjusted bit rate specified at 720 is suggested to the user for publishing the consolidated video stream at 722.

Referring next to FIG. 8, an exemplary flow chart illustrates of the publication of the consolidated video stream as described in reference to FIG. 6. If a maximum file size is desired, the BFPR is executed at 802. The frames along the timeline that define the consolidated video are analyzed to determine the maximum resolution, $T_R$, and the time, t, associated with the playback of the consolidated video stream at 804. At 806, the total target bit rate, $TT_{BR}$, is calculated based on a designated file size and the determined time, t. At 807, a first list of profiles specifying a first bit rate, BR1, and a second list of profiles specifying a second bit rate, BR2, are identified such that $TT_{BR}$ is between BR1 and BR2, where R2 is less than $TT_{BR}$. The BFPR determines whether $TT_{BR}$ is less than or equal to BR2 plus a bit rate error margin (i.e., 0.1*(BR1−BR2)) at 808. If $TT_{BR}$ is less than or equal to BR2 plus the bit rate error margin, then the BFPR selects the list of profiles specifying BR2 at 810. If $TT_{BR}$ is greater than BR2 plus the bit rate error margin, then BFPR selects the list of profiles specifying BR1 at 812. At 813, a first profile specifying a first resolution, R1, and a second profile specifying a second resolution, R2, are identified from the selected list of profiles such that $T_R$ is between R1 and R2, where R2 is less than $T_R$. The BFPR determines whether $T_R$ is less than or equal to R2 plus a resolution error margin (i.e., 0.1*(R1−R2)) at 814. If $T_R$ is less than or equal to R2 plus the resolution error margin, then the BFPR selects the profile specifying R2 at 816. If $T_R$ is greater than R2 plus the bit rate error margin, then the BFPR selects the profile specifying R1 at 818. At 820, the bit rate specified in the profile selected at 816 or 818 is adjusted to specify the maximum bit rate $TT_{BR}$ for best fit. The BQPR (see FIG. 7) is executed to determine the maximum bit rate that provides the best quality (i.e., $T_{BR}$) at 822. The BFPR determines whether the bit rate that corresponds to the best fit to file size profile $TT_{BR}$ is greater than the bit rate that corresponds to the best quality profile $T_{BR}$ at 824. If $TT_{BR}$ is greater than $T_{BR}$, the profile selected at 816 or 818 with a bit rate of $T_{BR}$ is suggested to the user for publishing the consolidated video stream at 826. If $TT_{BR}$ is less than or equal to $T_{BR}$, the profile selected at 816 or 818 with a bit rate of $TT_{BR}$ is suggested to the user for publishing the consolidated video stream at 828.

FIG. 9 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer-readable media. Computer-readable media, which include both volatile and nonvolatile media, removable and non-removable media, may be any available medium that can be accessed by computer 130. By way of example and not limitation, computer-readable media comprise computer storage media and communication media. Computer storage media include volatile and nonvolatile, removable and non-removable media implemented in any method or technology for storage of information such as computer-readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can accessed by computer 130. Communication media typically embody computer-readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer-readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 9 illustrates operating system 144, application programs 146, other program modules 148, and program data 150.

The computer 130 may also include other removable/non-removable, volatile/nonvolatile computer storage media. For example, FIG. 9 illustrates a hard disk drive 154 that reads from or writes to non-removable, nonvolatile magnetic media. FIG. 9 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 144, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 9, provide storage of computer-readable instructions, data structures, program modules and other data for the computer 130. In FIG. 9, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 9 include a local area network (LAN) 196 and a wide area network (WAN) 198, but may also include other networks. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 194, or other appropriate mechanism. In a networked environment, program modules depicted relative to computer 130, or portions thereof, may be stored in a remote memory storage device (not shown). By way of example, and not limitation, FIG. 9 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions and methods [without departing from the scope of the invention, it is intended that all matter contained in the above description and shown in the accompanying drawings shall be interpreted as illustrative and not in a limiting sense.

Appendix

TABLE 1

Example Video Profiles

| Name | Total target bit rate | Resolution in 4:3 mode | Resolution in 16:9 mode | Frame Rate | Audio Profile |
|---|---|---|---|---|---|
| DV-AVI | DV-AVI (25 Mbps) | 720 × 480 or 720 × 576 (Interlaced or Progressive)) | 720 × 480 or 720 × 576 (Interlaced or Progressive) | 59.940058 . . . fields per second or 50 fields per second | |
| All profiles below here are progressive. The "High Quality" Profiles change depending on the NTSC/PAL setting in Tools|Options, the rest are unfiltered. | | | | | |
| High Quality for Local Playback (2.5 Mbps) | 2.5 Mbps | 720 × 480 or 720 × 576 if PAL in Tools|Options | 720 × 480 or 720 × 576 if PAL in Tools|Options | 30 fps or 25 fps if PAL in Tools|Options | 1 |
| High Quality for Local Playback (1.5 Mbps) | 1.5 Mbps | 720 × 480 or 720 × 576 if PAL in Tools|Options | 720 × 480 or 720 × 576 if PAL in Tools|Options | 30 fps or 25 fps if PAL in Tools|Options | 2 |
| High Quality for Local Playback (1 Mbps) | 1 Mbps | 720 × 480 or 720 × 576 if PAL in Tools|Options | 720 × 480 or 720 × 576 if PAL in Tools|Options | 30 fps or 25 fps if PAL in Tools|Options | 3 |
| Video for Broadband (768 Kbps) | 768 Kbps | 640 × 480 | 852 × 480 | 30 fps | 4 |
| Video for Broadband (512 Kbps) | 512 Kbps | 480 × 360 | 640 × 360 | 30 fps | 5 |
| Video for Broadband | 304 Kbps | 320 × 240 | 428 × 240 | 30 fps | 6 |
| Video for Broadband (128 Kbps) | 128 Kbps | 320 × 240 | 428 × 240 | 15 fps | 7 |
| Video for ISDN | 48 Kbps | 160 × 120 | 212 × 120 | 15 fps | 8 |
| Video for dial-up connection | 33.6 Kbps | 160 × 120 | 212 × 120 | 10 fps | 8 |
| Video for Pocket PC (225 Kbps) | 225 Kbps | 208 × 160 | 208 × 116 | 20 fps | Based on system profiles |
| Video for Pocket PC (150 Kbps) | 150 Kbps | 208 × 160 | 208 × 116 | 8 fps | Based on system profiles |
| Full Screen video for Pocket PC (225 Kbps) | 225 Kbps | 320 × 240 | 320 × 180 | 15 fps | Based on system profiles |

TABLE 2

Example Audio Profiles

| Profile Number | Name | Audio bit rate | Audio sample rate | Output |
|---|---|---|---|---|
| 1 | High Quality Audio (160 Kbps) | 160 Kbps | 44.1 kHz | Stereo |
| 2 | High Quality Audio (128 Kbps) | 128 Kbps | 44.1 kHz | Stereo |
| 3 | High Quality Audio (96 Kbps) | 96 Kbps | 44.1 kHz | Stereo |
| 4 | CD Quality Audio (64 Kbps) | 64 Kbps | 44.1 kHz | Stereo |
| 5 | Near-CD Quality Audio (48 Kbps) | 48 Kbps | 44.1 kHz | Stereo |
| 6 | FM Quality Audio (32 Kbps) | 32 Kbps | 32 kHz | Stereo |
| 7 | AM Quality Audio (16 Kbps) | 16 Kbps | 16 kHz | Mono |
| 8 | Narration quality audio (8 Kbps) | 8 Kbps | 8 kHz | Mono |

EXAMPLE 1

Video Best Quality Publication

After examining the frames on the timeline it is determined that the maximum resolution is 720×480, and the maximum bit rate is 1.04 Mbps ($T_{BR}$). (Note: Default Aspect ratio 4:3, and assume TV standard NTSC in Tool/Options).

1. Starting with resolution, identify the set of video profiles with the resolution closest to 720×480. In this case several of the profiles listed in Table 1 specify the same resolution as the determined maximum resolution $T_R$.

| List of Profiles | | | | | |
|---|---|---|---|---|---|
| High Quality for Local Playback (2.5 Mbps) | 2.5 Mbps | 720 × 480 or 720 × 576 if PAL in Tools\|Options | 720 × 480 or 720 × 576 if PAL in Tools\|Options | 30 fps or 25 fps if PAL in Tools\|Options | 1 |
| High Quality for Local Playback (1.5 Mbps) | 1.5 Mbps | 720 × 480 or 720 × 576 if PAL in Tools\|Options | 720 × 480 or 720 × 576 if PAL in Tools\|Options | 30 fps or 25 fps if PAL in Tools\|Options | 2 |
| High Quality for Local Playback (1 Mbps) | 1 Mbps | 720 × 480 or 720 × 576 if PAL in Tools\|Options | 720 × 480 720 × 576 if PAL in Tools\|Options | 30 fps 25 fps if PAL in Tools\|Options | 3 |

2. Next identify a first profile specifying a first bit rate, $H_{BR}$, and a second profile specifying a second bit rate, $L_{BR}$, such that $H_{BR} > T_{BR} > L_{BR}$. From the list of profiles it is determined that the bit rate 1.04 Mbps is between 1 and 1.5 Mbps.

3. Use video best-quality selection instructions select one of the list of profiles:

If Tbr<=Lbr+0.1*(Hbr−Lbr) select video profile with the lower bit rate or

If Tbr>Lbr+0.1*(Hbr−Lbr) select video profile with the higher bit rate;

1.04 Mbps<0.1 Mbps+0.1(1.5 Mbps−1.04 Mbps)

1.04 Mbps<1.046 Mbps, so select the 1 Mbps, 720×480, 30 fps profile.

4. The video bit rate is either increased or decreased to match timeline bit rate. The bit rate shall not be increased above the absolute maximum video bit rate or decreased below the absolute minimum video bit rate, regardless of the content on the timeline. In this case, the profile of 1 Mbps, 720×480, 30 fps has its bit rate increased to 1.04 Mbps.

| High Quality for Local Playback (1 Mbps) | 1 Mbps | 720 × 480 or 720 × 576 if PAL in Tools\|Options | 720 × 480 720 × 576 if PAL in Tools\|Options | 30 fps 25 fps if PAL in Tools\|Options | 3 |
|---|---|---|---|---|---|

5. From Table 1 the corresponding audio profile is audio profile 3:

| 3 | High Quality Audio (96 Kbps) | 96 Kbps | 44.1 kHz | Stereo |
|---|---|---|---|---|

EXAMPLE 2

Audio Best Quality

1. After examining the timeline the maximum bit rate ($T_{BR}$) is determined to be 110 Kbps.

2. Next identify a first profile specifying a first bit rate, $H_{BR}$, and a second profile specifying a second bit rate, $L_{BR}$, such that $H_{BR} > T_{BR} > L_{BR}$. From the list of audio profiles in Table 2, it is determined that the bit rate 110 Kbps is between 128 Kbps and 1.5 Kbps Thus, profiles 2 and 3 are identified.

| List of Profiles | | | | |
|---|---|---|---|---|
| 2 | High Quality Audio (128 Kbps) | 128 Kbps | 44.1 kHz | Stereo |
| 3 | High Quality Audio (96 Kbps) | 96 Kbps | 44.1 kHz | Stereo |

TBR = 110 Kbps, Lbr = 96 Kbps, and Hbr = 128 Kbps

3. Use audio best-quality selection instructions to select on of the identified list of profiles:

If Tbr<=Lbr+0.1*(Hbr−Lbr) select audio profile with the lower bit rate or

If Tbr>Lbr+0.1*(Hbr−Lbr) select audio profile with the higher bit rate;

110>96 Kbs+1*(128 Kbps−96 Kbps)=99.2 Kbps

110 Kbs>99.2 Kbps, so the audio profile with the higher bit rate is selected (i.e., profile 2).

| 2 | High Quality Audio (128 Kbps) | 128 Kbps | 44.1 kHz | Stereo |
|---|---|---|---|---|

EXAMPLE 3

Video Best Fit Publication

After examining the timeline we find that the maximum resolution is 720×480, and the timeline length is 500 seconds. (Note: Default Aspect ratio 4:3, and assume TV standard NTSC in Tool/Options).

1. The user chose file size=20 MB (Note: MB=1024 KB.

2. Calculate Total Target bit rate=(20*8)/500=0.32 Mbps, or 320 Kbps.

3. Starting with the Total Target bit rate, $TT_{BR}$, identify a first list of profiles specifying the same first bit rate, $H_{BR}$ and a second list of profiles specifying the same second bit rate, $L_{BR}$ such that $H_{BR} > TT_{BR} > L_{BR}$. In this case, there is one profile in the list of first profiles and one profile in the list of second profiles because the no other profiles have the same bit rates.

From Table 1 the following profiles are identified.

| List of Profiles | | | | | |
|---|---|---|---|---|---|
| Video for Broadband (512 Kbps) | 512 Kbps | 480 × 360 | 640 × 360 | 30 fps | 5 |
| Video for Broadband | 304 Kbps | 320 × 240 | 428 × 240 | 30 fps | 6 |

$TT_{BR}$ = 320 Kbps,
$L_{BR}$ = 304 Kbps, and
$H_{BR}$ = 512 Kbps.

3. Use video best-fit selection instructions select one of the lists of profiles:

If $TT_{BR} \leq L_{BR}+0.1*(H_{BR}-L_{BR})$ select video profile with the lower bit rate or If $TT_{BR} > L_{BR}+0.1*(H_{BR}-L_{BR})$ select video profile with the higher bit rate;

320 Kbps+0.1*(512 Kbps−304 Kbps)=340.8 Kbps

320 Kbps<340 Kbps so the video profile with the lower bit rate is selected (i.e., video profile specifying 304 Kbps is selected).

| Video for Broadband | 304 Kbps | 320 × 240 | 428 × 240 | 30 fps | 6 |
|---|---|---|---|---|---|

From Table 1 the corresponding audio profile is profile 6.

| 6 | FM Quality Audio (32 Kbps) | 32 Kbps | 32 kHz | Stereo |
|---|---|---|---|---|

EXAMPLE 4

Audio Best-Fit Publication

After examining the timeline the timeline length is determined to be 120 seconds.

1. The user chooses file size=2 MB (e.g., e-mail).
2. Calculate Total Target bit rate=(2*8)/120=0.133 Mbps, or 133 Kbps.
3. Next identify a first profile specifying a first bit rate, $H_{BR}$, and a second profile specifying a second bit rate, $L_{BR}$, such that $H_{BR} > TT_{BR} > L_{BR}$. From the list of audio profiles in Table 2, it is determined that the bit rate 133 Kbps is between 128 Kbps and 160 Kbps.

| 1 | High Quality Audio (160 Kbps) | 160 Kbps | 44.1 kHz | Stereo |
|---|---|---|---|---|
| 2 | High Quality Audio (128 Kbps) | 128 Kbps | 44.1 kHz | Stereo |

$TT_{BR}$ = 133 Kbps, $L_{BR}$ = 128 Kbps, and $H_{BR}$ = 160 Kbps.

Use audio best-fit selection instructions select one of the lists of profiles:

If $TT_{BR} \leq L_{BR}+0.1*(H_{BR}-L_{BR})$ select audio profile with the lower bit rate or If $TT_{BR} > L_{BR}+0.1*(H_{BR}-L_{BR})$ select audio profile with the higher bit rate;

133 Kbps>128 Kbps+0.1*(160 Kbps-128 Kbps) or

133 Kbps>131.2 Kbps, so the audio profile with the higher bit rate is selected (i.e., audio profile 1).

| 1 | High Quality Audio (160 Kbps) | 160 Kbps | 44.1 kHz | Stereo |
|---|---|---|---|---|

What is claimed is:

1. A computer readable medium having computer executable instructions for capturing a video stream comprising:
   format instructions for determining a format of the video stream;
   property instructions for determining a property of the of the video stream;
   selecting instructions for selecting a profile corresponding to the determined format and the determined property of the video stream; and
   capturing instructions for capturing the video stream according to the selected profile.

2. The computer readable medium of claim 1 wherein the selecting instructions select from a list of pre-defined profiles, each specifying a plurality of parameters for capturing a stream of video.

3. The computer readable medium of claim 1 wherein the format instructions includes instructions for determining one or more following formats:
   an aspect ratio of the video stream;
   a frame rate of the video stream;
   a resolution of the video stream; or
   a frame display mode (e.g., interlaced or progressive scan) of the video stream, and wherein the selecting instructions select the profile as a function of the determined format.

4. The computer readable medium of claim 3 wherein the property instructions includes instructions for determining a bit rate of the video stream, and wherein the selecting instructions select the profile as a function of the determined resolution and/or bit rate.

5. The computer readable medium of claim 4 wherein the selecting instructions includes instructions for selecting one of the list of profiles specifying a resolution approximately equal to or less than the determined resolution of the video stream and specifying a frame rate approximately equal to or less than the determined frame rate of the video stream.

6. The computer readable medium of claim 1 wherein the format and property of the video stream is defined by a video source which generates the video stream, or wherein the format and property of the video stream is defined by a capture tool which captures the video stream.

7. The computer readable medium of claim 1 further comprising default instructions which, in the event that the format of the video stream cannot be determined by the format instructions, designate the determined format according to a format specified in a default setting, and which, in the event that the property of the video stream cannot be determined by the property instructions, designate the determined property according to a property specified in a default setting.

8. The computer readable medium of claim 7, wherein the default setting is defined by a TOOLS/OPTIONS setting or a REGION setting within an operating system stored on the computer readable medium.

9. The computer readable medium of claim 1 further comprising a profile database for storing the list of profiles.

10. A method for capturing a video stream according to one of a list of profiles, each profile specifying a plurality of parameters for capturing a stream of video;
   determining a format of the video stream;
   determining a property of the video stream;
   selecting one of the profiles of list of profiles corresponding to the determined format and the determined property of the video stream; and
   capturing the video stream according to the selected profile.

11. The method of claim 10 wherein the determining a format includes determining one or more of the following:
   an aspect ratio of the video stream
   a frame rate of the video stream;
   a resolution of the video stream; or
   a frame display mode (e.g., interlaced or progressive scan) of the video stream, and wherein the selecting one of the profiles includes selecting the profile as a function of the determined format.

12. The method of claim 11 wherein the determining the property includes determining a bit rate of the video stream, and wherein the selecting one of the profiles includes selecting the profile as a function of the determined resolution and/or bit rate.

13. The method of claim 12 wherein the selecting one of the profiles includes selecting one of the list of profiles specifying a resolution approximately equal to or less than the determined resolution of the video stream and specifying a frame rate approximately equal to or less than the determined frame rate of the video stream.

14. The method of claim 10 further comprising designating the determined format according to a format specified based a TOOLS/OPTIONS setting or based on a REGION setting in the event that the format of the video stream cannot be determined by the format instructions.

15. A method for publishing a video stream according to one of a list of profiles, each profile specifying a plurality of parameters for publishing a stream of video;
   determining a format of the video stream;
   determining a property of the video stream;
   selecting one of the profiles of list of profiles corresponding to the determined format and the determined property of the video stream; and
   publishing the video stream according to the selected profile.

16. The method of claim 15 wherein the determining a format includes determining one or more of the following:
   an aspect ratio of the video stream
   a frame rate of the video stream;
   a resolution of the video stream; or
   a frame display mode (e.g., interlaced or progressive scan) of the video stream, and wherein the selecting one of the profiles includes selecting the profile as a function of the determined format.

17. The method of claim 15 wherein the determining the property includes determining a bit rate of the video stream, and wherein the selecting one of the profiles includes selecting the profile as a function of the determined resolution and/or bit rate.

18. The method of claim 15 wherein the selecting one of the profiles includes selecting one of the profiles that will produce a best quality video during playback, or wherein the selecting one of the profiles includes selecting one of the profiles that will best fit a file size designated by a user.

19. The method of claim 15 further comprising designating the determined format according to a format specified based a TOOLS/OPTIONS setting or based on a REGION setting in the event that the format of the video stream cannot be determined by the format instructions.

20. A computer readable medium comprising:
   a capture routine executing capturing instructions for capturing a video stream corresponding to a capture profile selected from a list of profiles, wherein the capture profile defines a video format and a video property of the video stream; and
   a publishing routine executing publishing instructions for publishing a consolidated video stream corresponding to a publish profile selected from the list of profiles, wherein the publish profile defines a video format and a video property of the consolidated video stream.

21. The computer readable medium of claim 20 wherein the capturing instructions include retrieving the capture profile from a profile database storing a list of profiles, wherein the retrieved capture profile specifies parameters for capturing the video stream, and wherein each parameter specifies a desired format value (e.g., resolution, frame rate, etc.) and/or a desired property value (e.g., bit rate) for capturing the video stream.

22. The computer readable medium of claim 20 wherein the publishing instructions include retrieving the publish profile from a profile database storing a list of profiles, wherein the retrieved publish profile specifies parameters for publishing the video, and wherein each parameter specifies a desired format value (e.g., resolution, frame rate, etc.) and/or a desired property value (e.g., bit rate) for publishing the video stream.

23. The computer readable medium of claim 22 wherein the publishing instructions include publishing the consolidated video stream according to parameters specified in one of the list of profiles that will produce the best quality video during playback.

24. The computer readable medium of claim 22 wherein the publishing instructions include publishing the consolidated video stream according to parameters specified in one of the list of profiles and a maximum file size defined by the user.

25. A computer readable medium comprising:
   a capture routine executing capturing instructions for capturing an audio stream corresponding to a capture profile, wherein the capture profile defines an audio property of the audio stream; and
   a publishing routine executing publishing instructions for publishing a consolidated audio stream corresponding to a publish profile, wherein the publish profile defines an audio property of the consolidated audio stream, and
   wherein the publishing instructions include retrieving the publish profile from a profile database storing a list of profiles, wherein the retrieved publish profile specifies a parameter for publishing the audio stream, wherein the parameter specifies a desired property value (e.g., bit rate, output mode, etc.) for publishing the audio stream, and
   wherein the publishing instructions include publishing the consolidated audio stream according to parameters specified in one of the list of profiles that will produce the best quality audio during playback.

26. The computer readable medium of claim 25 wherein the capturing instructions include retrieving the capture profile from a profile database storing a list of profiles, wherein the retrieved capture profile specifies a parameter for capturing the audio stream, and wherein the parameter specifies a desired property value (e.g., bit rate, output mode etc.) for capturing the audio stream.

27. The computer readable medium of claim 25 wherein the publishing instructions include publishing the consolidated audio stream according to parameters specified in one of the list of profiles and a maximum file size defined by the user.

28. A computer readable medium having computer executable instructions for publishing a consolidated video stream from a timeline comprising a plurality of individual video streams, said computer readable medium comprising:
    format instructions for determining a format of the consolidated video stream;
    property instructions for determining a property of the consolidated video stream;
    identifying instructions for identifying a list of profiles corresponding to the determined format and the determined property of the consolidated video stream;
    selecting instructions for selecting one of the identified list of profiles corresponding to the determined format and the determined property of the consolidated video stream; and
    publishing instructions for publishing the consolidated video stream according to the selected profile.

29. The computer readable medium of claim 28 wherein the identifying instructions identify the list of profiles from a list of pre-defined profiles, each profile specifying a plurality of parameters for publishing a stream of video.

30. The computer readable medium of claim 28 wherein the format instructions includes instructions for determining one or more of the following:
    an aspect ratio of the consolidated video stream;
    a frame rate of the consolidated video stream;
    a resolution of the consolidated video stream; or
    a frame display mode (e.g., interlaced or progressive scan) of the consolidated video stream, and wherein the selecting instructions select the profile as a function of the determined format.

31. The computer readable medium of claim 30 wherein the property instructions includes instructions for determining a bit rate of the video stream, and wherein the selecting instructions select the profile as a function of the determined resolution and/or bit rate.

32. The computer readable medium of claim 31 wherein the resolution and bit rate are determined by determining a maximum resolution of the plurality of individual video streams from the timeline and a maximum bit rate of the plurality of individual video streams from the timeline, respectively.

33. The computer readable medium of claim 31 wherein the identifying instructions includes instructions for identifying a set of profiles from the list of profiles corresponding to the determined resolution of the consolidated video stream, wherein the identified set of profiles comprises at least two of the list of profiles each specifying a resolution equal to the determined resolution of the consolidated video stream, or wherein, in the event at least two of the list of profiles do not specify a resolution equal to the determined resolution, the identified set of profiles comprise a first list of profiles each specifying a same resolution which is less than the determined resolution of the consolidated video stream and a second list of profiles each specifying a same resolution which is greater than the determined resolution of the consolidated video stream.

34. The computer readable medium of claim 33 wherein the selecting instructions include selecting the profile from the list of profiles having the greatest resolution when the determined resolutions is greater than the greatest resolution in the list of profiles, and wherein the selecting instructions include selecting the profile from the list of profiles having the lowest resolution when the determined resolution is less than the lowest resolution in the list of profiles.

35. The computer readable medium of claim 33 further comprising identifying instructions for identifying from the identified set of profiles a first profile specifying a bit rate less than the determined bit rate of the consolidated video stream and identifying instructions for identifying a second profile specifying a bit rate greater than the determined resolution of the consolidated video stream.

36. The computer readable medium of claim 35 wherein the selecting instructions includes instructions for selecting one of the identified list of profiles corresponding to the identified set of profiles as a function of a determined resolution of the consolidated video stream.

37. The computer readable medium of claim 35 wherein the selecting instructions for selecting one of the identified list of profiles from the identified set of profiles include the following:
    If TR<=LR+0.1*(HR−LR), select list of profiles with the lower resolution or
    If TR>LR+0.1*(HR−LR), select list of profiles with the higher resolution;
where TR is the maximum resolution determined from the timeline, LR is the second resolution specified by the second list of profiles, and HR is the first resolution specified by the first list of profiles.

38. The computer readable medium of claim 35 wherein the selecting instructions includes instructions for selecting one of the identified list of profiles as function of the difference between the bit rate specified in the first profile and the bit rate specified in the second profile.

39. The computer readable medium of claim 35 wherein the selecting instructions for selecting one of the profiles from the identified list of profiles include the following:
    If TBR<=LBR+0.1*(HBR−LBR), select video profile with the lower bit rate or
    If TBR>LBR+0.1*(HBR−LBR), select video profile with the higher bit rate;
where TBR is the maximum bit rate determined from the timeline, LBR is the bite rate specified by the second profile, and HBR is the bite rate specified by the first profile.

40. The computer readable medium of claim 28 further comprising default instructions which, in the event that the format of the video stream cannot be determined by the format instructions, designate the determined format according to a format specified in a default setting, and which, in the event that the property of the video stream cannot be determined by the property instructions, designate the determined property according to a property specified in a default setting.

41. The computer readable medium of claim 40 further comprising default instructions which, in the event that the format of the video stream cannot be determined by the format instructions, designate the determined format according to a format specified based a TOOLS/OPTIONS setting or based on a REGION setting.

42. The computer readable medium of claim 28 wherein the publication instruction includes instructions for publishing the consolidated video stream to a destination computer readable medium and/or to a host computer readable medium in response to an input received from a user via a user interface.

43. A computer readable medium having executable instructions for publishing a consolidated video stream from a timeline comprising a plurality of individual video streams having a total length of time, said program comprising:

format instructions for determining a format of the consolidated video stream;
property instructions for determining a property of the consolidated video stream;
determining instructions for determining a target file size of the consolidated video stream to be published;
calculating instructions for calculating a total target bit rate based on the determined target file size and the total length of time of the consolidated video stream;
identifying instructions for identifying a list of profiles corresponding to the calculated target bit rate;
profile selecting instructions for selecting one of the profiles of the identified list of profiles corresponding to the calculated target bit rate; and
publishing instructions for publishing the consolidated video stream according to the selected profile.

44. The computer readable medium of claim 43 wherein the identifying instructions identify the list of profiles from a list of pre-defined profiles, each specifying a plurality of parameters for publishing a stream of video.

45. The computer readable medium of claim 43 wherein determining the format includes determining one or more following:
an aspect ratio of the consolidated video stream;
a frame rate of the consolidated video stream;
a resolution of the consolidated video stream; or
a frame display mode (e.g., interlaced or progressive scan) of the consolidated video stream, and wherein the selecting instructions select the profile as a function of the determined format.

46. The computer readable medium of claim 45 wherein the format instructions includes instructions for determining a resolution of the consolidated video stream, and wherein the selecting instructions select the profile as a function of the determined resolution.

47. The computer readable medium of claim 46 wherein the resolution is determined by determining a maximum resolution of the plurality of individual video streams from the timeline.

48. The computer readable medium of claim 43 wherein the identifying instructions includes instructions for identifying a set of profiles from the list of profiles corresponding to the calculated total target bit rate for the consolidated video stream, wherein the identified set of profiles comprise a first list of profiles each specifying a same bit rate which is less than the calculated total target bit rate for the consolidated video stream and a second list of profiles each specifying a same bit rate which is greater than the calculated total target bit rate for the consolidated video stream.

49. The computer readable medium of claim 43 wherein the selecting instructions include selecting the profile from the list of profiles having the greatest bit rate when the calculated bit rate is greater than the greatest bit rate in the list of profiles, and wherein the selecting instructions include selecting the profile from the list of profiles having the lowest bit rate when the calculated bit rate is less than the lowest bit rate in the list of profiles.

50. The computer readable medium of claim 43 wherein the identifying instructions includes instructions for identifying a set of profiles from the list of profiles corresponding to the calculated total target bit rate for the consolidated video stream, wherein the identified set of profiles comprises a first profile specifying a bit rate which is less than the calculated total target bit rate and a second profile specifying a bit rate which is greater than the calculated total target bit rate.

51. The computer readable medium of claim 50 wherein the selecting instructions includes instructions for selecting one of the identified list of profiles corresponding to the identified set of profiles as a function of the calculated total target bit rate for the consolidated video stream.

52. The computer readable medium of claim 50, wherein the selecting instructions for selecting one of the identified list of profiles from the identified set of profiles include the following:
If TTBR<=LBR+0.1*(HBR−LBR), select list of profiles with the lower bit rate or
If TTBR>LBR+0.1*(HBR−LBR), select list of profiles with the higher bit rate;
where TTBR is the calculated total target bit rate, LBR is the bite rate specified by the second profile, and HBR is the bite rate specified by the first profile.

53. The computer readable medium of claim 50 wherein the selecting instructions includes instructions for selecting one of the profiles from identified list of profiles as a function of the difference between the resolution specified in the first profile and the resolution specified in second profile.

54. The computer readable medium of claim 51 wherein the selecting instructions for selecting one of the profiles from the identified list of profiles include the following:
If TR<=LR+0.1*(HR−LR), select profile with the lower resolution or
If TR>LR+0.1*(HR−LR), select of profile with the higher resolution;
where TR is the maximum resolution determined from the timeline, LR is the second resolution specified by the second list of profiles, and HR is the first resolution specified by the first list of profiles.

55. The computer readable medium of claim 51 wherein the identifying instructions further includes instructions for identifying a best quality bit rate, wherein the best quality bit rate corresponds to a bit rate producing the best quality during play back of the consolidated video stream, and wherein the selection instructions include comparing the best quality bit rate to the bit rate specified in the selected profile, and wherein the selection instructions replace the specified bit rate with the best quality bit rate when the specified bit is greater than the best quality bit rate.

56. The computer readable medium of claim 43 further comprising default instructions which, in the event that the format of the video stream cannot be determined by the format instructions, designate the determined format according to a format specified in a default setting, and which, in the event that the property of the video stream cannot be determined by the property instructions, designate the determined property according to a property specified in a default setting.

57. The computer readable medium of claim 43 further comprising default instructions which, in the event that the format of the video stream cannot be determined by the format instructions, designate the determined format according to a format specified based on a TOOLS/OPTIONS setting or based on a REGION setting.

58. The computer readable medium of claim 43 wherein the target file size is determined from an input received from a user via a user interface.

59. The computer readable medium of claim 43 wherein the publication instruction includes instructions for publishing the consolidated video stream to a destination computer readable medium and/or to a host computer readable medium in response to an input received from a user via a user interface.

60. A computer readable medium having computer executable instructions for capturing an audio stream comprising:
a list of profiles, each specifying a plurality of parameters for capturing a stream of audio;

property instructions for determining a bit rate of the audio stream;

selecting instructions for selecting one of the profiles of the list of profiles corresponding to the determined bit rate of the audio stream wherein the selected profile specifies a bit rate approximately equal to or less than the determined bit rate of the audio stream; and capturing instructions for capturing the audio stream according to the selected profile.

61. The computer readable medium of claim 60 wherein the property of the audio stream is defined by an audio source which generates the audio stream, or wherein the property of the audio stream is defined by a capture tool which captures the audio stream.

62. The computer readable medium of claim 60 further comprising default instructions which, in the event that the property of the audio stream cannot be determined by the property instructions, designate the determined property according to a property specified in a default setting.

63. The computer readable medium of claim 62 wherein the default setting is defined by a TOOLS/OPTIONS setting.

64. A computer readable medium having computer executable instructions for publishing a consolidated audio stream from a timeline comprising a plurality of individual audio streams, said computer readable medium comprising:

a list of profiles, each specifying a plurality of parameters for publishing a stream of audio;

property instructions for determining a property of the consolidated audio stream;

identifying instructions for identifying profiles from the list which correspond to the determined bit rate of the consolidated audio stream;

selecting instructions for selecting one of the profiles of the identified list of profiles corresponding to the determined bit rate of the consolidated audio stream; and publishing instructions for publishing the consolidated audio stream according to the selected profile.

65. The computer readable medium of claim 64 wherein the property instructions include determining a bit rate of the consolidated audio stream, and wherein the selecting instructions select the profile as a function of the determined bit rate.

66. The computer readable medium of claim 65 wherein the bit rate is determined by determining a maximum bit rate of the plurality of individual audio streams from the timeline.

67. The computer readable medium of claim 65 wherein the identifying instructions includes instructions for identifying a set of profiles from the list of profiles corresponding to the determined bit rate of the consolidated audio stream, wherein the identified set of profiles comprise a first profile each specifying a bit rate which is less than the determined bit rate of the consolidated audio stream and a second profile specifying a bit rate which is greater than the determined bit rate of the consolidated audio stream.

68. The computer readable medium of claim 64 wherein the selecting instructions include selecting the profile from the list of profiles having the greatest bit rate when the determined bit rate is greater than the greatest bit rate in the list of profiles, and wherein the selecting instructions include selecting the profile from the list of profiles having the lowest bit rate when the determined bit rate is less than the lowest bit rate in the list of profiles.

69. The computer readable medium of claim 67 wherein the selecting instructions includes instructions for selecting one of the list of profiles from the identified set of profiles as function of the difference between the bit rate specified in the first profile and the bit rate specified in the second profile.

70. The computer readable medium of claim 67 wherein the selecting instructions for selecting one of the profiles from the identified list of profiles include the following:

If TBR<=LBR+0.1*(HBR−LBR), select audio profile with the lower bit rate or

If TBR>LBR+0.1*(HBR−LBR), select audio profile with the higher bit rate;

where TBR is the maximum bit rate determined from the timeline, LBR is the bite rate specified by the second profile, and HBR is the bite rate specified by the first profile.

71. The computer readable medium of claim 64 further comprising default instructions which, in the event that the bit rate of the audio stream cannot be determined by the property instructions, designate the determined bit rate according to a bit rate specified in a default setting.

72. The computer readable medium of claim 64 wherein the publication instruction includes instructions for publishing the consolidated audio stream to a destination computer readable medium and/or to a host computer readable medium in response to an input received from a user via a user interface.

73. A computer readable medium having executable instructions for publishing a consolidated audio stream from a timeline comprising a plurality of individual audio streams having a total length of time, said program comprising:

a list of profiles, each specifying a plurality of parameters for publishing a stream of audio;

determining instructions for determining a target file size of the consolidated audio stream to be published;

calculating instructions for calculating a target bit rate based on the determined target file size and the total length of time of the consolidated audio stream;

identifying instructions for identifying profiles from the list which correspond to the calculated target bit rate;

profile selecting instructions for selecting one of the list of profiles corresponding to the calculated target bit rate; and publishing instructions for publishing the consolidated audio stream according to the selected profile.

74. The computer readable medium of claim 73 wherein the selecting instructions include selecting the profile from the list of profiles having the greatest bit rate when the calculated bit rate is greater than the greatest bit rate in the list of profiles, and wherein the selecting instructions include selecting the profile from the list of profiles having the lowest bit rate when the calculated bit rate is less than the lowest bit rate in the list of profiles.

75. The computer readable medium of claim 73 wherein the identifying instructions includes instructions for identifying a set of profiles from the list of profiles corresponding to the target bit rate of the consolidated audio stream, wherein the identified set of profiles comprise a first profile each specifying a bit rate which is less than the target bit rate of the consolidated audio stream and a second profile specifying a bit rate which is greater than the target bit rate of the consolidated audio stream.

76. The computer readable medium of claim 75 wherein the selecting instructions includes instructions for selecting one of the list of profiles from the identified set of profiles as function of the difference between the bit rate specified in the first profile and the bit rate specified in the second profile.

77. The computer readable medium of claim 75 wherein the selecting instructions for selecting one of the profiles from the identified list of profiles include the following:

If TTBR<=LBR+0.1*(HBR−LBR), select audio profile with the lower bit rate or

If TTBR>LBR+0.1*(HBR−LBR), select audio profile with the higher bit rate;

where TTBR is the calculated total target bit rate, LBR is the bite rate specified by the second profile, and HBR is the bite rate specified by the first profile.

78. The computer readable medium of claim 73 wherein the target file size is determined from an input received from a user received from a user via a user interface.

79. The computer readable medium of claim 73 wherein the publication instruction includes instructions for publishing the consolidated audio stream to a destination computer readable medium and/or to a host computer readable medium in response to an input received from a user via a user interface.

* * * * *